US012754968B2

(12) United States Patent
Otsuka

(10) Patent No.: US 12,754,968 B2
(45) Date of Patent: Oct. 6, 2026

(54) INFORMATION PROCESSING DEVICE, SOLUTION METHOD, AND COMPUTER-READABLE RECORDING MEDIUM STORING SOLUTION PROGRAM

(71) Applicant: FUJITSU LIMITED, Kawasaki (JP)

(72) Inventor: Hiroshi Otsuka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1032 days.

(21) Appl. No.: 17/842,859

(22) Filed: Jun. 17, 2022

(65) Prior Publication Data

US 2023/0068699 A1 Mar. 2, 2023

(30) Foreign Application Priority Data

Sep. 1, 2021 (JP) ................................ 2021-142683

(51) Int. Cl.
*G06F 17/11* (2006.01)
*G06Q 10/04* (2023.01)

(52) U.S. Cl.
CPC ............ *G06F 17/11* (2013.01); *G06Q 10/04* (2013.01)

(58) Field of Classification Search
CPC ........ G06F 17/11; G06Q 10/04; G06Q 10/06; G06Q 10/06311
See application file for complete search history.

(56) References Cited

FOREIGN PATENT DOCUMENTS

| | | | |
|---|---|---|---|
| JP | H05-204891 | A | 8/1993 |
| JP | 2006-277060 | A | 10/2006 |
| JP | 2009-258969 | A | 11/2009 |
| JP | 2010-218045 | A | 9/2010 |

(Continued)

OTHER PUBLICATIONS

Chu, G., Gange, G., Stuckey, P.J. (2016). Lagrangian Decomposition via Sub-problem Search. In: Quimper, CG. (eds) Integration of AI and OR Techniques in Constraint Programming. CPAIOR 2016. Lecture Notes in Computer Science( ), vol. 9676. Springer, Cham. https://doi.org/10.1007/978-3-319-33954-2_6 (Year: 2016).*

(Continued)

*Primary Examiner* — Carlo Waje
(74) *Attorney, Agent, or Firm* — Fujitsu Intellectual Property Center

(57) ABSTRACT

An information processing device configured to perform processing, the processing including: determining a division granularity when a linear programming problem is divided into a plurality of partial problems on the basis of an allowable time needed to solve the linear programming problem to be solved; creating an objective function of each of partial problems divided from the linear programming problem on the basis of the determined division granularity from an objective function of the linear programming problem; creating a constraint expression of each of the partial problems on the basis of a constraint expression group of the linear programming problem and past allocation result data regarding a variable included in the linear programming problem; and obtaining a solution for the linear programming problem by sequentially solving each of the partial problems on the basis of the objective function and the constraint expression created for each of the partial problems.

5 Claims, 20 Drawing Sheets

(56) References Cited

FOREIGN PATENT DOCUMENTS

| | | |
|---|---|---|
| JP | 2018-185639 | 11/2018 |
| JP | 2018-190417 A | 11/2018 |

OTHER PUBLICATIONS

JPOA—Office Action of Japanese Patent Application No. 2021-142683 mailed on Feb. 18, 2025 with full English translation.
Extended European Search Report dated Nov. 16, 2022 for corresponding European Patent Application No. 22180118.6, 8 pages.
Anonymous, "Divide-and-conquer algorithm—Wikipedia", Mar. 9, 2020, XP055725343, Retrieved from the Internet: URL:https://en.wikipedia.org/w/index.php?title=Divide-and-conquer_algorithm&oldid=944645588, [retrieved on Aug. 26, 2020], 7 pages.
S. Hasegawa, "Solving Nurse Scheduling Problem by IP-Based Local Search", The Institute of Electronics, Information and Communication Engineers (D), vol. J89-D, No. 10, pp. 2251-2259, Oct. 1, 2006 with full English translation.

* cited by examiner

FIG. 5

500

| | FIRST WEEK | | | | SECOND WEEK | | | | THIRD WEEK | | | | FOURTH WEEK | | | |
|---|---|---|---|---|---|---|---|---|---|---|---|---|---|---|---|---|
| | DAY | | | ... | DAY | | | ... | DAY | | | ... | DAY | | | ... |
| PATTERN | 1 | 2 | 3 | ... | 1 | 2 | 3 | ... | 1 | 2 | 3 | ... | 1 | 2 | 3 | ... |
| X | vX1 | vX2 | vX3 | ... | vX22 | vX23 | vX24 | ... | vX43 | vX44 | vX45 | ... | vX64 | vX65 | vX66 | ... |
| Y | vY1 | vY2 | vY3 | ... | vY22 | vY23 | vY24 | ... | vY43 | vY44 | vY45 | ... | vY64 | vY65 | vY66 | ... |
| Z | vZ1 | vZ2 | vZ3 | ... | vZ22 | vZ23 | vZ24 | ... | vZ43 | vZ44 | vZ45 | ... | vZ64 | vZ65 | vZ66 | ... |
| ... | ... | ... | ... | ... | ... | ... | ... | ... | ... | ... | ... | ... | ... | ... | ... | ... |

FIG. 8

800

| THE NUMBER OF DAYS | CALCULATION TIME (SECOND) | REQUIRED NUMBER OF TIMES OF EXECUTIONS | TOTAL CALCULATION TIME (MAXIMUM VALUE) |
|---|---|---|---|
| 1 | 1.400 | 30 | 42 |
| 2 | 1.960 | 15 | 29.4 |
| 3 | 2.744 | 10 | 27.44 |
| 4 | 3.842 | 8 | 30.7328 |
| 5 | 5.378 | 6 | 32.26944 |
| 6 | 7.530 | 5 | 37.64768 |
| 7 | 10.541 | 5 | 52.706752 |
| 8 | 14.758 | 4 | 59.03156224 |
| 9 | 20.661 | 4 | 82.64418714 |
| 10 | 28.925 | 3 | 86.77639649 |
| 11 | 40.496 | 3 | 121.4869551 |
| 12 | 56.694 | 3 | 170.0817371 |
| 13 | 79.371 | 3 | 238.114432 |
| 14 | 111.120 | 3 | 333.3602048 |
| 15 | 155.568 | 2 | 311.1361911 |
| 16 | 217.795 | 2 | 435.5906676 |
| 17 | 304.913 | 2 | 609.8269346 |
| 18 | 426.879 | 2 | 853.7577084 |
| 19 | 597.630 | 2 | 1195.260792 |
| 20 | 836.683 | 2 | 1673.365109 |
| 21 | 1171.356 | 2 | 2342.711152 |
| 22 | 1639.898 | 2 | 3279.795613 |
| 23 | 2295.857 | 2 | 4591.713858 |
| 24 | 3214.200 | 2 | 6428.399401 |
| 25 | 4499.880 | 2 | 8999.759161 |
| 26 | 6299.831 | 2 | 12599.66283 |
| 27 | 8819.764 | 2 | 17639.52796 |
| 28 | 12347.670 | 2 | 24695.33914 |
| 29 | 17286.737 | 2 | 34573.47479 |
| 30 | 24201.432 | 1 | 24201.43236 |

FIG. 12

500

CONSTRAINT EXPRESSION OF ORIGINAL PROBLEM : vX2+vX3+vX23+vX24+vX43+vX45+vX65+vX66<=3

| | FIRST WEEK | | | | SECOND WEEK | | | | THIRD WEEK | | | | FOURTH WEEK | | | |
|---|---|---|---|---|---|---|---|---|---|---|---|---|---|---|---|---|
| | DAY | | | … | DAY | | | … | DAY | | | … | DAY | | | … |
| PATTERN | 1 | 2 | 3 | … | 1 | 2 | 3 | … | 1 | 2 | 3 | … | 1 | 2 | 3 | … |
| X | vX1 | vX2 | vX3 | … | vX22 | vX23 | vX24 | … | vX43 | vX44 | vX45 | … | vX64 | vX65 | vX66 | … |
| Y | | | | | | | | | | | | | | | | |
| Z | | | | | | | | | | | | | | | | |
| | | | | | | | | | | | | | | | | |

vX2+vX3+vX23+vX24=C2

1002

| | FIRST WEEK | | | | SECOND WEEK | | | |
|---|---|---|---|---|---|---|---|---|
| | DAY | | | … | DAY | | | … |
| PATTERN | 1 | 2 | 3 | … | 1 | 2 | 3 | … |
| X | 0 | 0 | 1 | … | 0 | 1 | 0 | … |

vX2+vX3+vX23+vX24=2

INFORMATION PROCESSING DEVICE, SOLUTION METHOD, AND COMPUTER-READABLE RECORDING MEDIUM STORING SOLUTION PROGRAM

CROSS-REFERENCE TO RELATED APPLICATION

This application is based upon and claims the benefit of priority of the prior Japanese Patent Application No. 2021-142683, filed on Sep. 1, 2021, the entire contents of which are incorporated herein by reference.

FIELD

The embodiment discussed herein is related to an information processing device, a solution method, and a non-transitory computer-readable storage medium storing a solution program.

BACKGROUND

In recent years, against a background of labor shortage, in various types of businesses such as transportation, human resources, or nursing homes, there has been increasing needs for services that match people, and goods and things using field data and aim for increasing working efficiency. Furthermore, there is a case where shifts of nurses in hospitals or operators in call centers are allocated using linear programming.

There is related art that extracts progress plan input data related to a target period, obtains a calculation unit for dividing the target period into a plurality of periods so as to satisfy a constraint condition on the basis of regression data, sequentially creates a progress plan for each calculation unit from the progress plan input data, and creates a progress plan related to the target period. The regression data corresponds to a scale parameter of the progress plan input data.

Furthermore, there is a technique for creating an objective function from a given environment variable and state variable and obtaining a minimum value of the objective function. Furthermore, there is a technique for accepting designation of creation accuracy of a plan for allocating work processes to resources and creating a plan on the basis of an algorithm corresponding to the creation accuracy and a plan creation termination condition corresponding to the creation accuracy.

Japanese Laid-open Patent Publication No. 2009-258969, Japanese Laid-open Patent Publication No. 5-204891, and Japanese Laid-open Patent Publication No. 2018-190417 are disclosed as related art.

SUMMARY

According to an aspect of the embodiments, there is provided an information processing device including: a memory; and a processor coupled to the memory, the processor being configured to perform processing. In an example, the processing includes: determining a division granularity when a linear programming problem is divided into a plurality of partial problems on the basis of an allowable time needed to solve the linear programming problem to be solved; creating an objective function of each of partial problems divided from the linear programming problem on the basis of the determined division granularity from an objective function of the linear programming problem; creating a constraint expression of each of the partial problems on the basis of a constraint expression group of the linear programming problem and past allocation result data regarding a variable included in the linear programming problem; and obtaining a solution for the linear programming problem by sequentially solving each of the partial problems on the basis of the objective function and the constraint expression created for each of the partial problems.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory diagram illustrating a specific example of a linear programming problem to be solved;

FIG. 8 is an explanatory diagram illustrating a specific example of a prediction model;

FIG. 12 is an explanatory diagram (part 2) illustrating the creation example of the constraint expression of the partial problem;

DESCRIPTION OF EMBODIMENTS

However, according to the related art, there is a case where a problem size of a linear programming problem increases and it is not possible to obtain a solution within a user's allowable time.

In one aspect, an object of the embodiment is to aim for shortening a solution time of a linear programming problem.

Hereinafter, embodiments of an information processing device, a solution method, and a solution program will be described in detail with reference to the drawings.

Embodiment

Figure 1:
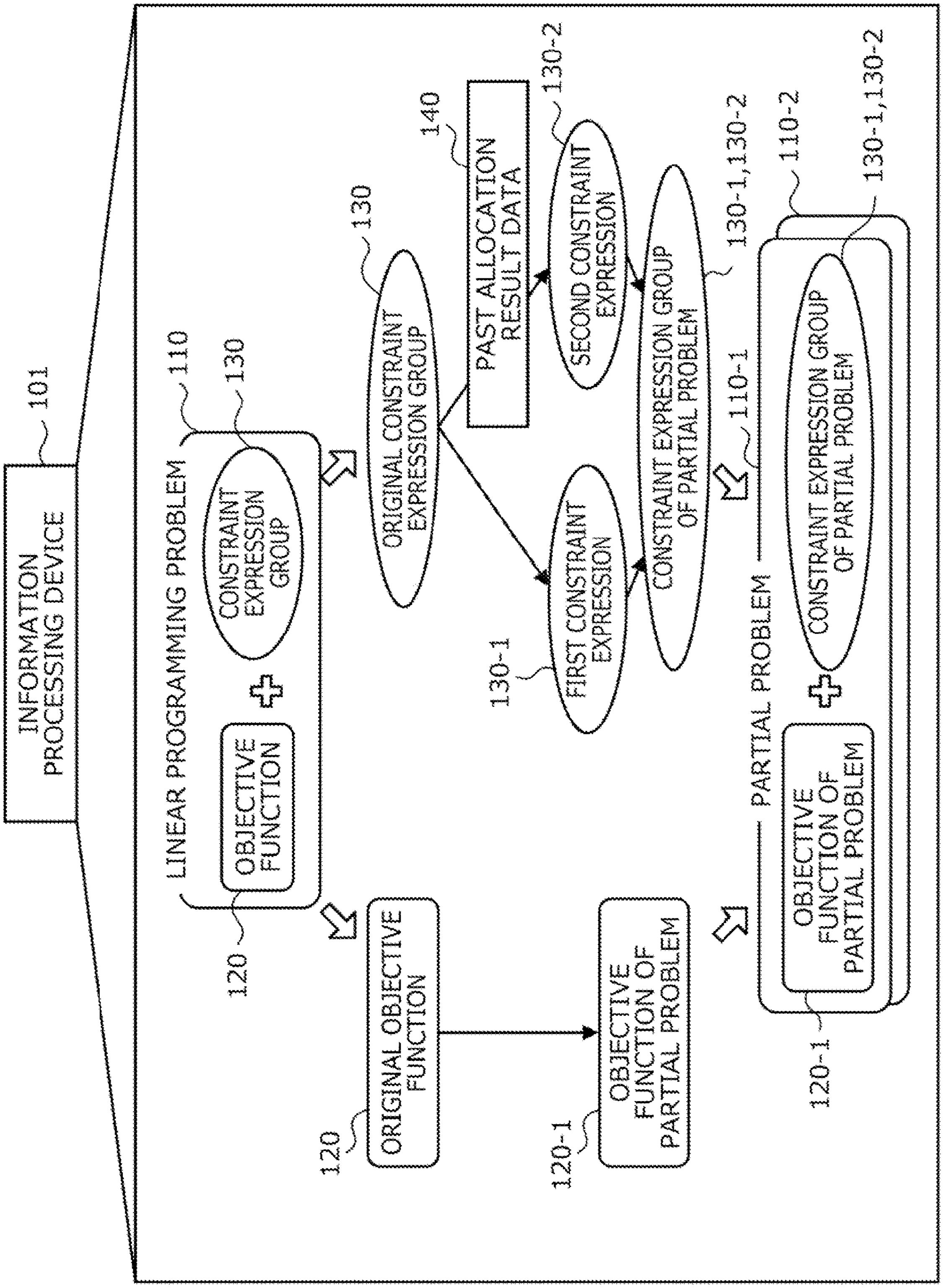
FIG. 1 is an explanatory diagram illustrating an example embodiment of a solution method according to an embodiment.

FIG. 1 is an explanatory diagram illustrating an example embodiment of a solution method according to an embodiment. In FIG. 1, an information processing device 101 is a computer that solves a linear programming problem. The linear programming problem is a problem in which an objective function is a linear function and a constraint condition can be described as an equation or an inequality of a linear function in an optimization problem. Furthermore, to solve a linear programming problem is to obtain a value of a variable that optimizes (maximizes or minimizes) the objective function under the constraint conditions.

Here, there is a case where matching between people, and goods and things is performed using linear programming. For example, when nurse's working schedule is created, there is a case where it is desired to automate a shift allocation work, which has been manually performed by a veteran person in charge so far, with shift allocation using the linear programming.

Furthermore, when a usage schedule for operating rooms, medical instruments, or the like is created, there is a case where it is desired to automate an allocation work that has been manually performed so far. Furthermore, when shift allocation of operators in a call center is performed, there is a case where it is desired to automate an allocation work that has been manually performed so far.

For example, taking shift allocation of nurses as an example, a linear programming problem can be solved using an existing solver by formulating the linear programming problem as an optimization problem for obtaining a combination between a nurse and a work shift for each day (day shift, night shift, midnight shift, or the like). At this time, various constraint conditions such as legal requirements, individual demands, and business conditions are set.

For example, the legal requirements include maximum working hours per week, intervals between working hours, or the like. Furthermore, the individual demands include a demand for vacation, a demand for training, or the like. Furthermore, the business conditions include allocating late-evening and early-morning works evenly, allocating works so that a work start time does not drastically change, or the like.

On the other hand, a time (calculation amount) needed to solve the linear programming problem exponentially increases as a problem size of the linear programming problem increases. The problem size is expressed, for example, by the number of elements (for example, people, goods, and things) included in the linear programming problem or the number of constraint expressions (constraint condition) related to that.

As the problem size of the linear programming problem increases, there is a case where it is not possible to obtain a solution within a user's allowable time. Therefore, for example, it is considered to divide the problem into a plurality of partial problems so as to reduce the number of elements. However, when the partial problem is solved, the same problem that it is not possible to obtain a solution within a user's allowable time may occur.

Furthermore, depending on how to make the partial problem, there is a case where it is not possible to obtain a solution. For example, it is assumed that a condition is set such that a shift of A be allocated on Sunday three times per month when shift allocation for one month is performed. Furthermore, a case will be assumed where a problem is divided into partial problems for each week and ON/OFF of a shift of A on Sunday is selected. In this case, for example, when OFF is selected for the shift of A on Sundays in the first, the second, and the third week, it is not possible to obtain a solution.

Here, in a case where there is a constraint that should be satisfied by a plurality of elements (people, goods, and things), even if a part of the constraint is cut out, a constraint to be satisfied should exist. Therefore, in the present embodiment, a solution method will be described for obtaining a solution (approximate solution) that satisfies the constraints throughout the entire problem in a short time by extracting the constraint of which a part should be satisfied from past allocation result data and solving the problem using the constraint.

Hereinafter, a processing example of the information processing device 101 will be described.

(1) The information processing device 101 determines a division granularity of the linear programming problem on the basis of an allowable time needed to solve the linear programming problem to be solved. Here, the division granularity is a unit when the linear programming problem is divided into a plurality of partial problems. The linear programming problem includes an objective function and a constraint expression group.

The objective function is a function to be maximized or minimized in the optimization problem. The objective function is expressed by a primary expression including a variable. The constraint expression group is a set of constraint expressions (constraint condition) that a variable should satisfy. The allowable time can be arbitrarily set and is, for example, a time that a user can allow.

For example, the information processing device 101 searches for a maximum problem size that can be solved within the allowable time on the basis of the problem size of the linear programming problem and the allowable time. Then, the information processing device 101 determines the division granularity of the linear programming problem on the basis of the searched maximum problem size.

In the example in FIG. 1, a linear programming problem to be solved is assumed as a "linear programming problem 110", an objective function of the linear programming problem 110 is assumed as an "objective function 120", and a constraint expression group is assumed as a "constraint expression group 130". Furthermore, a case is assumed where a division granularity d of the linear programming problem 110 is determined on the basis of the allowable time needed to solve the linear programming problem 110.

(2) The information processing device 101 creates an objective function of each of the partial problems divided from the linear programming problem on the basis of the determined division granularity from the objective function of the linear programming problem. For example, the information processing device 101 extracts a variable corresponding to each partial problem from the linear programming problem, for each partial problem.

For example, in a case where the linear programming problem is divided according to a period (the number of days), the variable corresponding to each partial problem is a variable included in a period corresponding to each partial problem. Furthermore, in a case where the linear programming problem is divided according to the number of persons, the variable corresponding to each partial problem is a variable regarding humans as many as the number of persons corresponding to each partial problem. Then, the information processing device 101 creates the objective function of each partial problem by removing a variable different from the extracted variable from the objective function of the linear programming problem, for each partial problem.

In the example in FIG. 1, the partial problems divided from the linear programming problem 110 on the basis of the division granularity d are assumed as "partial problems 110-1 and 110-2". Taking the partial problem 110-1 as an example, an objective function 120-1 of the partial problem 110-1 is created by removing a variable different from a variable corresponding to the partial problem 110-1 from the objective function 120 (original objective function) of the linear programming problem 110.

(3) The information processing device 101 creates a constraint expression of each of the partial problems on the basis of the constraint expression group of the linear programming problem and past allocation result data regarding a variable included in the linear programming problem. The past allocation result data is past allocation result data corresponding to the linear programming problem to be solved and indicates, for example, a shift allocation result of a period (the number of days) and a person same as those of the linear programming problem to be solved.

For example, the information processing device 101 creates a first constraint expression of each partial problem by extracting a constraint expression that consists of only variables included in each partial problem of the constraint expression group of the linear programming problem. Furthermore, the information processing device 101 creates a second constraint expression of each partial problem on the basis of remaining constraint expressions, excluding the first constraint expression, of the constraint expression group of the linear programming problem and the past allocation result data.

More specifically, for example, the information processing device 101 extracts a member, including only the variables included in the partial problem, from the remaining constraint expressions. Next, the information processing device 101 refers to the past allocation result data and specifies a value of each extracted member. Then, the information processing device 101 creates the second constraint expression including each extracted member on the basis of the specified value of each member.

In the example in FIG. 1, constraint expressions of the partial problems 110-1 and 110-2 are created on the basis of the constraint expression group 130 (original constraint expression group) of the linear programming problem 110 and past allocation result data 140 regarding the variable included in the linear programming problem 110. Taking the partial problem 110-1 as an example, by extracting a constraint expression that consists of only variables included in the partial problem 110-1 of the constraint expression group 130 of the linear programming problem 110, a first constraint expression 130-1 of the partial problem 110-1 is created. Furthermore, a second constraint expression 130-2 of the partial problem 110-1 is created on the basis of remaining constraint expressions, excluding the first constraint expression 130-1, of the constraint expression group 130 of the linear programming problem 110 and the past allocation result data 140.

(4) The information processing device 101 obtains a solution for the linear programming problem by sequentially solving each of the partial problems on the basis of the objective function and the constraint expression created for each partial problem. For example, the information processing device 101 sequentially solves the partial problems on the basis of the objective function and the constraint expression of the partial problem using an existing solver (linear programming solver).

At this time, the information processing device 101 creates a constraint expression "variable=value of solution result" for all the variables on the basis of the partial problem solution result and adds the constraint expression as a constraint expression of another partial problem. By fixing some variables included in the partial problem to a solution that has been already obtained, the problem size of the partial problem is reduced. In this way, the information processing device 101 obtains a solution for the linear programming problem by solving each partial problem in order.

In the example in FIG. 1, the solution for the linear programming problem 110 is obtained by sequentially solving each of the partial problems 110-1 and 110-2 using an existing solver.

In this way, the information processing device 101 can divide the linear programming problem to be solved into the partial problems and solve the linear programming problem. Furthermore, the information processing device 101 can obtain a solution (approximate solution) that satisfies constraints throughout the entire problem within an allowable time by extracting the constraints applied to the partial problem from the past allocation result data.

This makes it possible to realize highly accurate shift allocation for nurses, operators, or the like while shortening a solution time of the linear programming problem. In the example in FIG. 1, the solution that satisfies the constraints throughout the entire problem can be obtained within a user's allowable time by dividing the linear programming problem 110 to be solved into the partial problems 110-1 and 110-2 and solving the linear programming problem 110.

(System Configuration Example of Information Processing System 200)

Next, a system configuration example of an information processing system 200 including the information processing device 101 illustrated in FIG. 1 will be described. Here, a case will be described as an example in which the information processing device 101 illustrated in FIG. 1 is applied to a solution processing device 201 in the information processing system 200. The information processing system 200 is applied to, for example, a service that automates allocation of resources such as people or goods.

Figure 2:
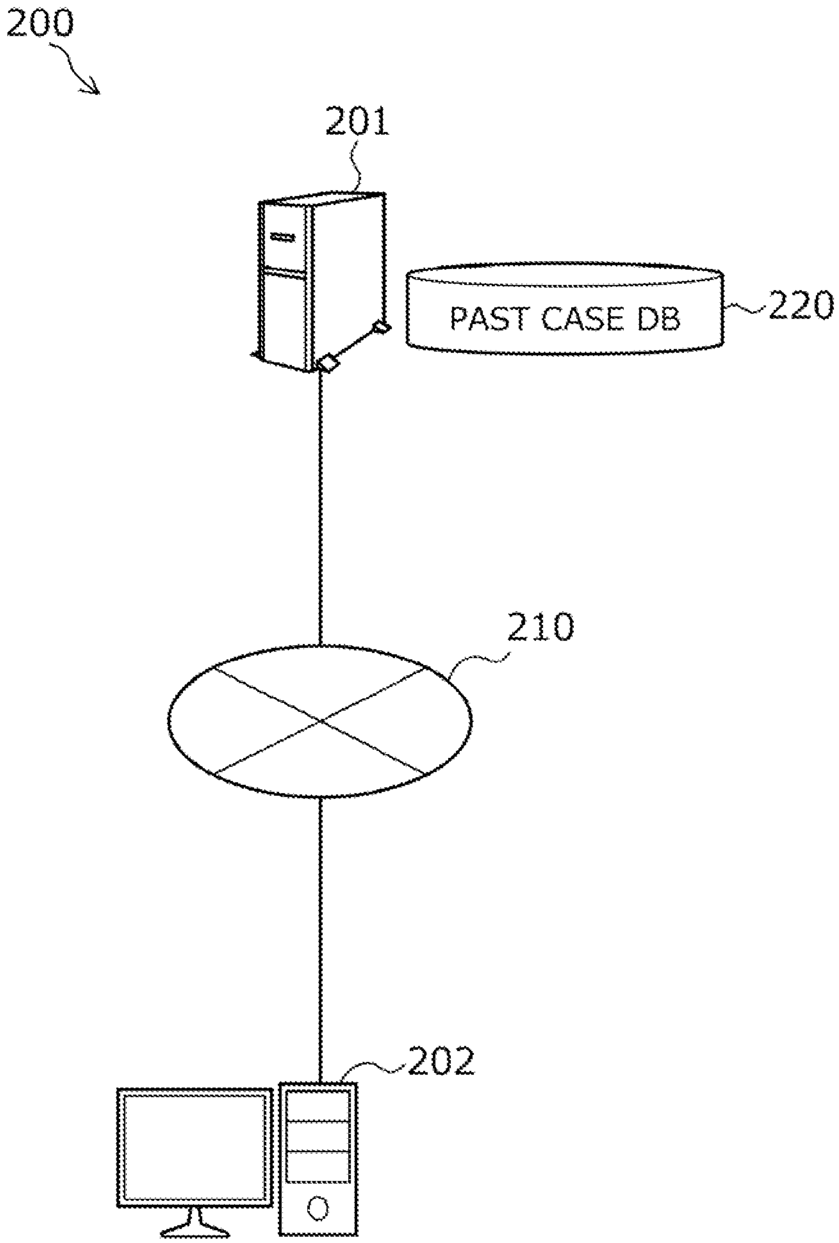
FIG. 2 is an explanatory diagram illustrating a system configuration example of an information processing system 200.

FIG. 2 is an explanatory diagram illustrating a system configuration example of the information processing system 200. In FIG. 2, the information processing system 200 includes the solution processing device 201 and a user terminal 202. In the information processing system 200, the solution processing device 201 and the user terminal 202 are connected via a wired or wireless network 210. The network 210 is, for example, the Internet, a local area network (LAN), a wide area network (WAN), or the like.

Here, the solution processing device 201 is a computer that includes a past case database (DB) 220 and obtains a solution for a linear programming problem to be solved. The solution processing device 201 is implemented, for example, by a server. However, the solution processing device 201 may be implemented by a personal computer (PC).

The past case DB 220 stores past allocation result data. The allocation result data indicates an allocation result of resources such as people or goods. For example, the allocation result data indicates a shift allocation result of a nurse in a hospital, an allocation result of an operating room, or the like. Storage content of the past case DB 220 will be described later with reference to FIG. 4. A specific example of the linear programming problem to be solved will be described later with reference to FIG. 5.

The user terminal 202 is a computer used by a user of the information processing system 200. For example, the user terminal 202 is a PC, a tablet PC, or the like. In the user terminal 202, for example, a user can obtain a solution result of the linear programming problem by designating the linear programming problem to be solved for the solution processing device 201.

Note that the information processing system 200 may include, for example, the plurality of user terminals 202. Furthermore, the solution processing device 201 may be implemented, for example, by a plurality of computers. Furthermore, the solution processing device 201 may be implemented, for example, by the user terminal 202. Furthermore, the past case DB 220 may be included in another computer that can be accessed by the solution processing device 201. In this case, the solution processing device 201 can refer to the past case DB 220 via the another computer.

(Hardware Configuration Example of Solution Processing Device 201)

Figure 3:
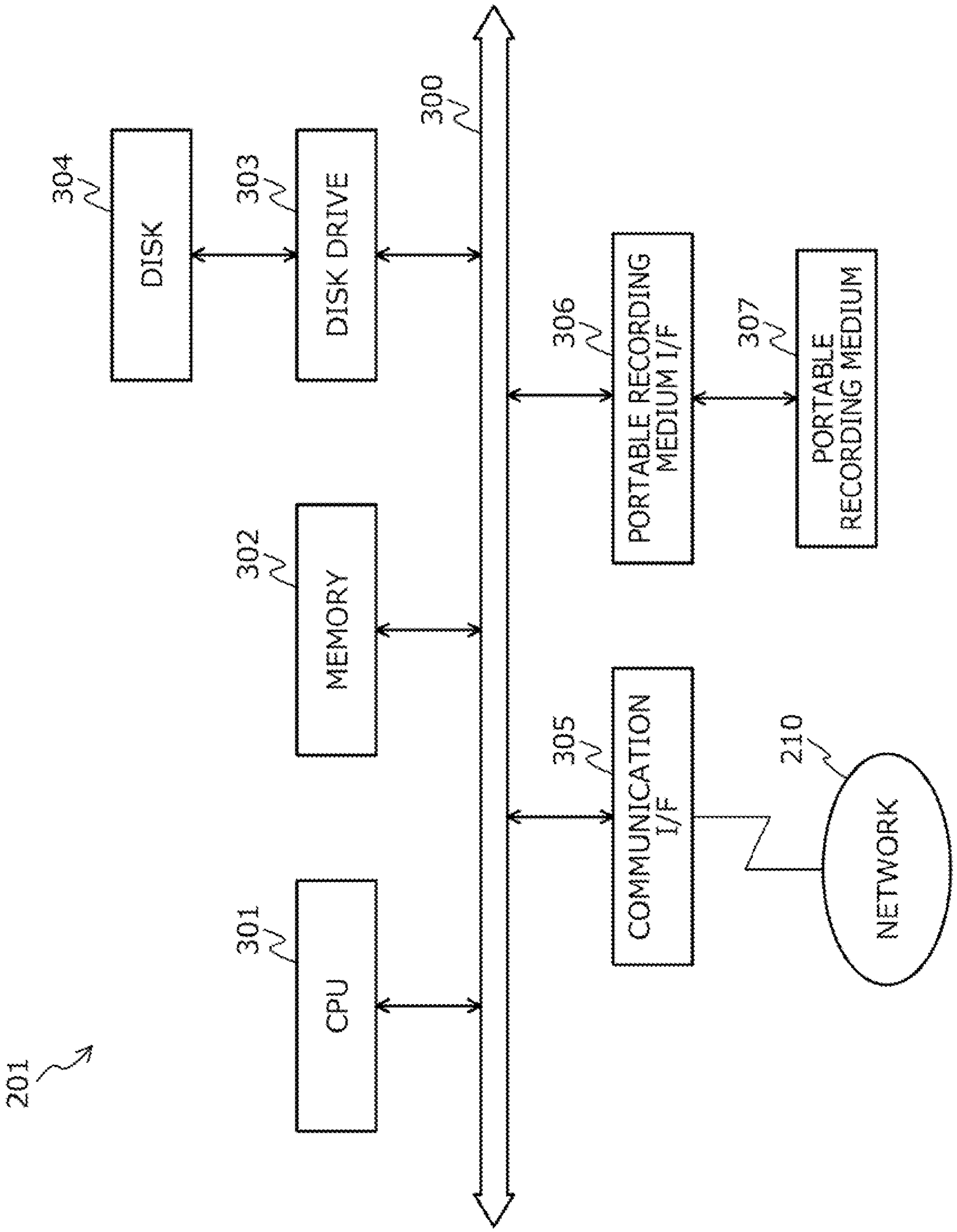
FIG. 3 is a block diagram illustrating a hardware configuration example of a solution processing device 201.

FIG. 3 is a block diagram illustrating a hardware configuration example of the solution processing device 201. In FIG. 3, the solution processing device 201 includes a central processing unit (CPU) 301, a memory 302, a disk drive 303, a disk 304, a communication interface (I/F) 305, a portable recording medium I/F 306, and a portable recording medium 307. Furthermore, the individual components are connected to each other by a bus 300.

Here, the CPU 301 controls the entire solution processing device 201. The CPU 301 may include a plurality of cores. The memory 302 includes, for example, a read only memory (ROM), a random access memory (RAM), a flash ROM, or the like. For example, the flash ROM stores an operating system (OS) program, the ROM stores application programs, and the RAM is used as a work area for the CPU 301. The program stored in the memory 302 is loaded to the CPU 301 to cause the CPU 301 to execute coded processing.

The disk drive 303 controls reading and writing of data from and into the disk 304, under the control of the CPU 301. The disk 304 stores data written under the control of the disk drive 303. The disk 304 may be a magnetic disk, an optical disk, or the like, for example.

The communication I/F 305 is connected to the network 210 through a communication line and is connected to an external computer (for example, the user terminal 202 illustrated in FIG. 2) via the network 210. Then, the communication I/F 305 manages an interface between the network 210 and the inside of the device, and controls input and output of data to and from an external computer. For example, a modem, a LAN adapter, or the like can be employed as the communication I/F 305.

The portable recording medium I/F 306 controls reading and writing of data from and into the portable recording medium 307 under the control of the CPU 301. The portable recording medium 307 stores data written under the control of the portable recording medium I/F 306. Examples of the portable recording medium 307 include a compact disc (CD)-ROM, a digital versatile disk (DVD), a universal serial bus (USB) memory, or the like.

Note that the solution processing device 201 may include, for example, an input device, a display, or the like, in addition to the components described above. Furthermore, the user terminal 202 illustrated in FIG. 2 can be implemented by a hardware configuration similar to the solution processing device 201. However, the user terminal 202 includes, for example, an input device, a display, or the like, in addition to the components described above.

(Storage Content of Past Case DB 220)

Next, storage content of the past case DB 220 included in the solution processing device 201 will be described. The past case DB 220 is implemented, for example, by a storage device such as the memory 302 or the disk 304 illustrated in FIG. 3.

Figure 4:
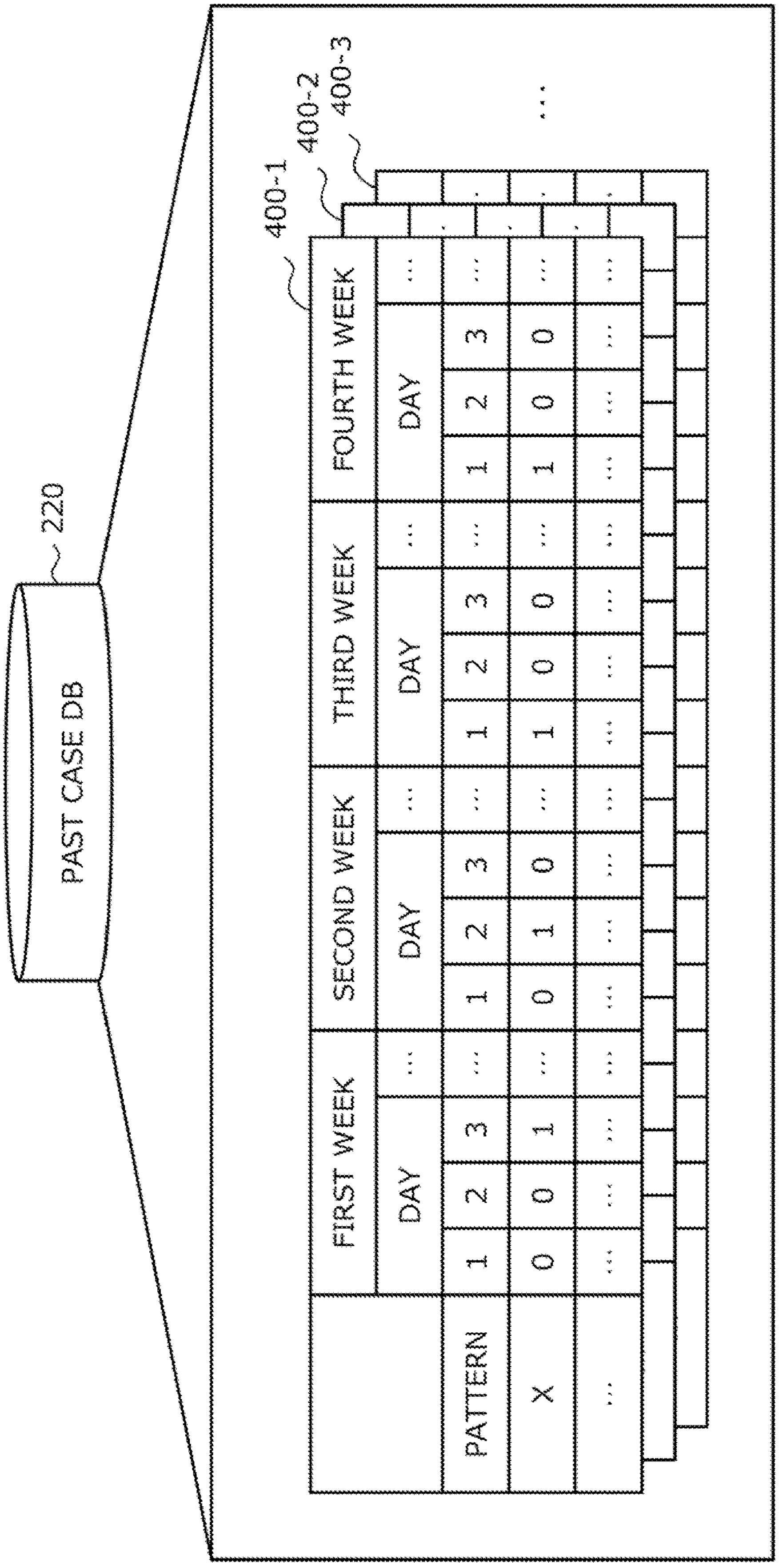
FIG. 4 is an explanatory diagram illustrating an example of storage content of a past case database (DB) 220.

FIG. 4 is an explanatory diagram illustrating an example of the storage content of the past case DB 220. In FIG. 4, the past case DB 220 stores past case data (for example, past case data 400-1 to 400-3). The past case data indicates a past allocation result. The past allocation result indicates, for example, a manually-allocated result. However, the past allocation result may indicate a result that is automatically allocated with an arbitrary allocation algorithm or may be a result that is obtained by manually correcting the automatically-allocated result.

For example, the past case data 400-1 indicates a shift allocation result (0 or 1) of X for each day (Sundays, Mondays, Tuesdays, Wednesdays, Thursdays, Fridays, and Saturdays) for four weeks. An allocation result "0" indicates that a shift is not allocated. An allocation result "1" indicates that a shift is allocated.

X is a name of a nurse. A pattern indicates working hours. A pattern 1 indicates a day shift. A pattern 2 indicates a night shift. A pattern 3 indicates a midnight shift. For example, taking Sunday in the first week as an example, this indicates that the shift of the pattern 3 is allocated for X. Furthermore, taking Sunday in the second week as an example, this indicates that the shift of the pattern 2 is allocated for X.

(Specific Example of Linear Programming Problem to Be Solved)

Next, the specific example of the linear programming problem to be solved will be described with reference to FIG. 5.

FIG. 5 is an explanatory diagram illustrating the specific example of the linear programming problem to be solved. In FIG. 5, a linear programming problem 500 is a problem to allocate shifts of nurses (X, Y, Z, . . . ) for each day (Sundays, Mondays, Tuesdays, Wednesdays, Thursdays, Fridays, and Saturdays) for four weeks. However, in FIG. 5, an element group of the linear programming problem 500 is illustrated.

In the linear programming problem 500, for example, vX1, vX2, . . . , and vX66 are variables each of which indicates an allocation result of a shift of X for each day. Furthermore, vY1, vY2, . . . , and vY66 are variables each of which indicates an allocation result of a shift of Y for each day. Furthermore, vZ1, vZ2, . . . , and vZ66 are variables each of which indicates an allocation result of a shift of Z for each day.

Note that the past case data 400-1 illustrated in FIG. 4 corresponds to information indicating the past allocation result for the variable (for example, vX1, vX2, . . . ) included in the linear programming problem 500.

(Functional Configuration Example of Solution Processing Device 201)

Figure 6:
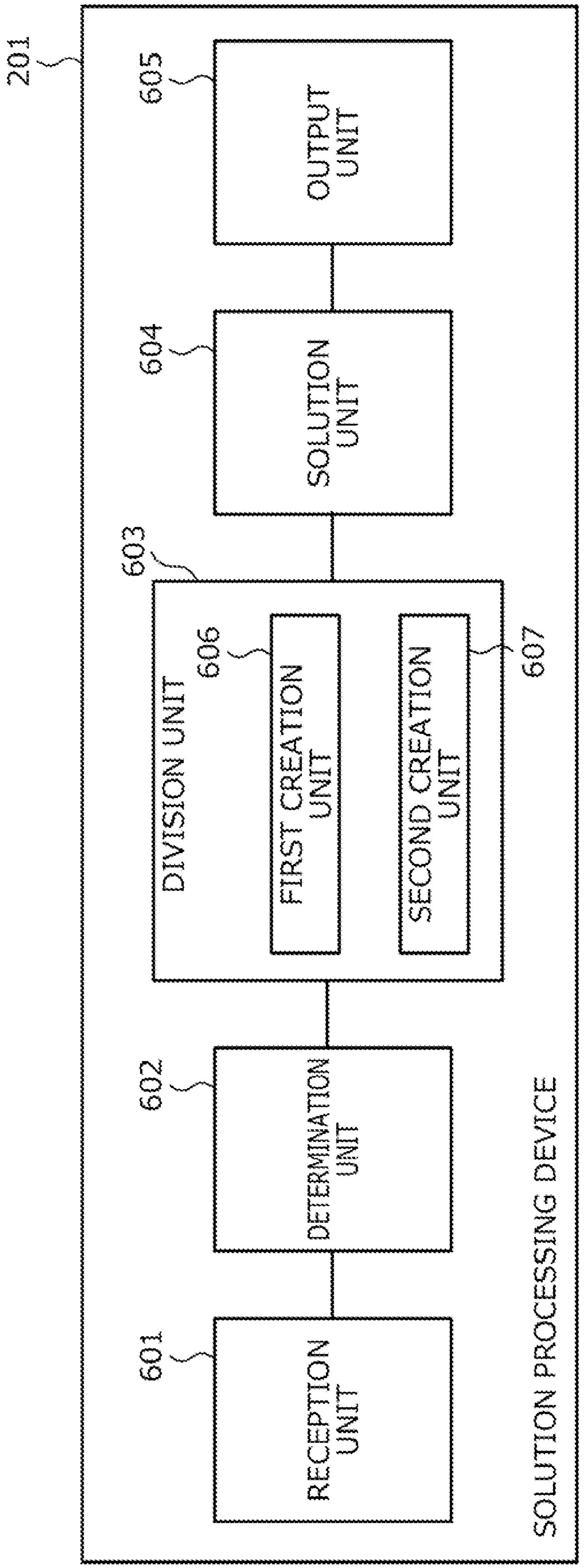
FIG. 6 is a block diagram illustrating a functional configuration example of the solution processing device 201.

FIG. 6 is a block diagram illustrating a functional configuration example of the solution processing device 201. In FIG. 6, the solution processing device 201 includes a reception unit 601, a determination unit 602, a division unit 603, a solution unit 604, and an output unit 605. The reception unit 601 to the output unit 605 have functions serving as a control unit, and those functions are implemented by causing the CPU 301 to execute the program stored in the storage device such as the memory 302, the disk 304, or the portable recording medium 307 illustrated in FIG. 3, or by the communication I/F 305, for example. A processing result of each functional unit is stored in, for example, the storage device such as the memory 302 or the disk 304.

The reception unit 601 receives an input of a linear programming problem to be solved. The linear programming problem includes an objective function and a constraint expression group. For example, the reception unit 601 receives target problem information from the user terminal 202 illustrated in FIG. 2 so as to receive an input of a linear programming problem included in the received target problem information.

Here, the target problem information includes the linear programming problem to be solved (for example, linear programming problem 500 illustrated in FIG. 5) and an allowable time $t_{limit}$. The allowable time $t_{limit}$ is an allowable time needed to solve the linear programming problem to be solved. Furthermore, the reception unit 601 may receive the input of the linear programming problem to be solved according to an operation input using an input device (not illustrated).

Furthermore, the reception unit 601 may receive designation of a problem ID of the linear programming problem to be solved. In this case, the reception unit 601 may receive the input of the linear programming problem to be solved by extracting the linear programming problem having the designated problem ID, from a problem DB (not illustrated).

The determination unit 602 determines a division granularity of the linear programming problem on the basis of the allowable time $t_{limit}$ needed to solve the linear programming problem to be solved. The division granularity is a unit used when a linear programming problem is divided into partial problems. The allowable time $t_{limit}$ is included, for example, in the target problem information.

For example, the determination unit 602 searches for an allowable size $d_{max}$ on the basis of a problem size of the linear programming problem and the allowable time $t_{limit}$. The allowable size $d_{max}$ is the maximum problem size that can be solved within the allowable time $t_{limit}$. At this time, the determination unit 602 may search for the allowable size $d_{max}$ on the basis of a prediction model that indicates a correspondence relationship between the problem size and the solution time, for example, using a binary search algorithm. Then, the determination unit 602 determines the division granularity of the linear programming problem on the basis of the searched allowable size $d_{max}$.

In the following description, there is a case where the linear programming problem to be solved is referred to as an "original problem". Note that an example of search for the allowable size $d_{max}$ will be described later with reference to FIGS. 7 and 8.

Furthermore, in a case where the problem size of the original problem is determined according to the number of days, the determination unit 602 may determine the division granularity as units of week or month. For example, in a case where the problem size in week unit (or month unit) is equal to or less than the allowable size $d_{max}$, the division unit 603 determines the division granularity as week unit (or month unit).

The division unit 603 divides the original problem on the basis of the determined division granularity. Dividing the original problem corresponds to creating the partial problem (objective function, constraint expression) from the original problem so as to reduce the number of elements. For example, the division unit 603 includes a first creation unit 606 and a second creation unit 607.

The first creation unit 606 creates an objective function of each of the partial problems divided from the original problem on the basis of the determined division granularity from the objective function of the original problem. For example, the first creation unit 606 extracts a variable corresponding to each partial problem from the original problem for each partial problem.

For example, in a case where the original problem is divided according to a period (the number of days), the variable corresponding to each partial problem is a variable included in a period corresponding to each partial problem. Then, the first creation unit 606 creates the objective function of each partial problem by removing a variable different from the extracted variable from the objective function of the original problem, for each partial problem.

As an example, the original problem is assumed as the "linear programming problem 500", and the objective function of the original problem 500 is assumed as "min (sum (all variables of Sunday))=min (vX1+vX2+vX3+ . . . +vX64+vX65+ . . . )". This objective function is set, for example, so that shifts are not allocated on Sundays as possible (to minimize the number of allocations). Furthermore, variables included in a partial problem are assumed as "vX1, vX2, and vX3".

In this case, the first creation unit 606 creates the objective function of the partial problem by removing a variable different from the variables vX1, vX2, and vX3 from the objective function of the original problem 500 "min (sum (all variables of Sunday))=min (vX1+vX2+vX3+ . . . +vX64+vX65+ . . . )". Here, the objective function of the partial problem is "min (sum (all variables of Sundays in the period))=min (vX1+vX2+vX3)". The period is a period corresponding to the partial problem (for example, first week).

In the following description, there is a case where the partial problems divided from the original problem are referred to as "partial problems $P_1$ to $P_k$" (k: natural number of one or more). Furthermore, there is a case where any partial problem of the partial problems $P_1$ to $P_k$ is referred to as a "partial problem $P_i$" (i=1, 2, . . . , and k).

The second creation unit 607 creates a constraint expression of the partial problem $P_i$ of each of the partial problems $P_1$ to $P_k$ on the basis of the constraint expression group of the original problem and the past allocation result data regarding the variable included in the original problem. The past allocation result data regarding the variable included in the original problem is past allocation result data corresponding to the original problem. The past allocation result data corresponding to the original problem indicates, for example, a shift allocation result of the same person in the same period (the number of days) as the original problem.

The past allocation result data may be designated together with the original problem (linear programming problem to be solved) in the target problem information, for example. Furthermore, the second creation unit 607 may, for example, refer to the past case DB 220 illustrated in FIG. 4 and search for the past case data indicating the shift allocation result of the same person in the same period (the number of days) as the original problem. When the original problem is assumed as the "linear programming problem 500", the past allocation result data regarding the variable included in the original problem is, for example, the past case data 400-1 illustrated in FIG. 4.

For example, the second creation unit 607 creates a first constraint expression of each partial problem $P_i$ by extracting a constraint expression that consists of only variables included in each partial problem $P_i$ of the constraint expression group of the original problem. As a result, the second creation unit 607 extracts a constraint expression related to the partial problem $P_i$ from the constraint expression group of the original problem.

As an example, it is assumed that the original problem be the "linear programming problem 500" and the constraint expressions of the original problem 500 include a constraint expression 1 "vX1+vY1+vZ1=1" and a constraint expression 2 "vX2+vX3+vX23+vX24+vX43+vX45+vX65+vX66≤3". It is assumed that the constraint expression 1 be an expression that consists of only variables appearing in the partial problem $P_1$. Furthermore, it is assumed that the constraint expression 2 be an expression that includes variables that are not included in the partial problem $P_1$. In this case, the second creation unit 607 creates the first constraint expression of the partial problem $P_1$ by extracting the constraint expression 1 that consists of only the variables included in the partial problem $P_i$ among the constraint expressions 1 and 2.

Furthermore, the second creation unit 607 creates a second constraint expression of each partial problem $P_i$ on the basis of remaining constraint expressions, excluding the first constraint expression, of the constraint expression group of the original problem and the past allocation result data. More specifically, for example, the second creation unit 607 extracts a member including only the variables included in the partial problem $P_i$ from the remaining constraint expressions.

Next, the second creation unit 607 refers to the past allocation result data and specifies a value of each extracted member. Then, the second creation unit 607 creates the second constraint expression including each extracted member on the basis of specified value of each member. Note that a division example of the original problem (linear programming problem to be solved) will be described later with reference to FIG. 9. Furthermore, a creation example of the constraint expression (second constraint expression) of the partial problem $P_i$ will be described later with reference to FIGS. 10 to 13.

The solution unit 604 obtains a solution for the original problem by sequentially solving each of the partial problems $P_i$ on the basis of the objective function and the constraint expression created for the partial problem $P_i$ of each of the partial problems $P_1$ to $P_k$. For example, the solution unit 604 solves the partial problem $P_i$ on the basis of the created objective function and constraint expression of the partial problem $P_i$ using an existing solver (linear programming solver).

Next, the solution unit 604 creates a constraint expression "variable=value of solution result" for all the variables on the basis of the solution result of the partial problem $P_i$ and adds the created constraint expression as a constraint expression of a partial problem $P_{i+1}$. In this way, by fixing some variables included in the partial problem $P_{i+1}$ to a solution that has been already obtained, a problem size of the partial problem $P_{i+1}$ is reduced.

Then, the solution unit 604 solves the partial problem $P_{i+1}$ on the basis of the created objective function and constraint expression of the partial problem $P_{i+1}$ (including constraint expression added on the basis of solution result of partial problem $P_i$) using an existing solver. In this way, the solution unit 604 obtains a solution for the original problem by sequentially solving the partial problems $P_1$ to $P_k$. Note that a specific example of solution processing for obtaining the solution of the original problem will be described later with reference to FIGS. 14A and 14B.

The output unit 605 outputs a solution result. Here, the solution result indicates a solution for the original problem. However, there is a case where it is not possible to obtain a solution. In this case, the solution result indicates no solution. Examples of an output format by the output unit 605 include storing the result in a storage device such as the memory 302 or the disk 304, transmitting the result to another computer (for example, user terminal 202) with the communication I/F 305, displaying the result on a display (not illustrated), outputting the result to a printer (not illustrated), or the like.

The functional unit of the solution processing device 201 described above may be implemented, for example, by the plurality of computers (for example, solution processing device 201 and user terminal 202) in the information processing system 200.

(Example of Search for Allowable Size $d_{max}$)

Next, an example of the search for the allowable size $d_{max}$ will be described with reference to FIGS. 7 and 8.

Figure 7:
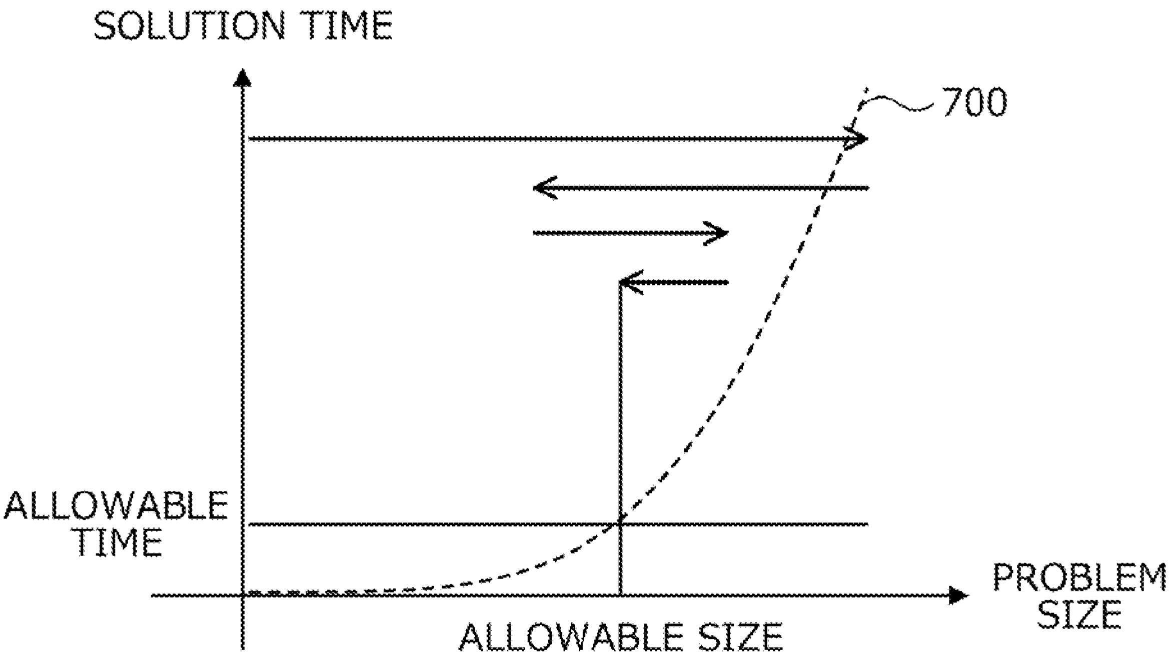
FIG. 7 is an explanatory diagram illustrating a correspondence relationship between a problem size and a solution time.

FIG. 7 is an explanatory diagram illustrating a correspondence relationship between a problem size and a solution time. In FIG. 7, a graph 700 indicates a solution time of a linear programming problem that increases as a problem size increases. The graph 700 corresponds to the prediction model that indicates the correspondence relationship between the problem size and the solution time.

For example, the determination unit 602 refers to the graph 700 and obtains the allowable size $d_{max}$ (maximum problem size) with which the solution time is within the allowable time $t_{limit}$ through binary search while changing the problem size for the allowable time $t_{limit}$.

Here, a calculation example of the allowable size $d_{max}$ will be described using a specific example of the prediction model. Here, it is assumed that nurse's shift allocation be performed, and a case is assumed where the problem size of the original problem be set to "20 persons and 30 days" and the original problem is divided by the number of days (the number of days) into the partial problems $P_1$ to $P_k$.

FIG. 8 is an explanatory diagram illustrating a specific example of a prediction model. In FIG. 8, a table 800 is an example of a prediction model that indicates a correspondence relationship between a problem size (the number of days) and a solution time (total calculation time). For example, the table 800 is generated in advance and is stored in a storage device such as the memory 302 or the disk 304.

In the table 800, the total calculation time (maximum value) indicates a time (maximum value) needed to allocate shifts of 20 persons when the original problem is divided into problems of each number of days (unit: second). A calculation time and the required number of times of executions respectively indicate a time needed for the solution processing of each partial problem and the number of times of executions of the solution processing when the original problem is divided into the problem of each number of days. The total calculation time (maximum value) is a value obtained by multiplying the calculation time by the required number of times of executions.

Here, the allowable time $t_{limit}$ is assumed as "$t_{limit}$=1800 seconds". In this case, first, the determination unit 602 refers to the table 800 as setting the unit of the number of days to be divided as "30 days" and specifies the total calculation time "24201" (search step 0). Here, the total calculation time "24201" exceeds the allowable time $t_{limit}$.

Therefore, the determination unit 602 calculates the number of days to be examined next (problem size) so as to reduce the problem size. Here, the number of days to be examined next is "the number of days to be examined next=30−{(30-0)/2}=15". In this case, the determination unit 602 refers to the table 800 as setting the unit of the number of days to be divided as "15 days" and specifies the total calculation time "311" (search step 1). Here, the total calculation time "311" is within the allowable time $t_{limit}$.

Therefore, the determination unit 602 calculates the number of days to be examined next so as to increase the problem size. Here, the number of days to be examined next is "the number of days to be examined next=15+{(22-15)/2}=19 (round after the decimal point)". In this case, the determination unit 602 refers to the table 800 as setting the unit of the number of days to be divided as "19 days" and specifies the total calculation time "1195" (search step 3). Here, the total calculation time "1195" is within the allowable time $t_{limit}$.

Therefore, the determination unit 602 calculates the number of days to be examined next so as to increase the problem size. Here, the number of days to be examined next is "the number of days to be examined next=19+{(22-19)/2}=21 (round after the decimal point)". In this case, the determination unit 602 refers to the table 800 as setting the unit of the number of days to be divided as "21 days" and specifies the total calculation time "2342" (search step 4). Here, the total calculation time "2342" exceeds the allowable time $t_{limit}$.

Therefore, the determination unit 602 calculates the number of days to be examined next so as to reduce the problem size. Here, the number of days to be examined next is "the number of days to be examined next=21−{(21−19)/2}=20". In this case, the determination unit 602 refers to the table 800 as setting the unit of the number of days to be divided as "20 days" and specifies the total calculation time "1673" (search step 5). Here, the total calculation time "1673" is within the allowable time $t_{limit}$.

Furthermore, when the number of days to be divided is "21 days", the total calculation time "2342" exceeds the allowable time $t_{limit}$. Therefore, the determination unit 602 determines the allowable size $d_{max}$ as "20 days". Note that, here, a case where the original problem is divided by the number of days (the number of days) has been described as an example. However, the embodiment is not limited to this. For example, the determination unit 602 may determine the allowable size $d_{max}$ when the original problem is divided by the number of persons.

(Division Example of Original Problem)

Next, a division example of the original problem (linear programming problem to be solved) will be described with reference to FIG. 9. Here, as the original problem, the linear programming problem 500 illustrated in FIG. 5 will be described as an example. Furthermore, a case is assumed where the problem size of the original problem 500 is set as "16 persons, 28 days" and the original problem 500 is divided by the number of days (the number of days) into the partial problems $P_1$ to $P_k$.

Figure 9:
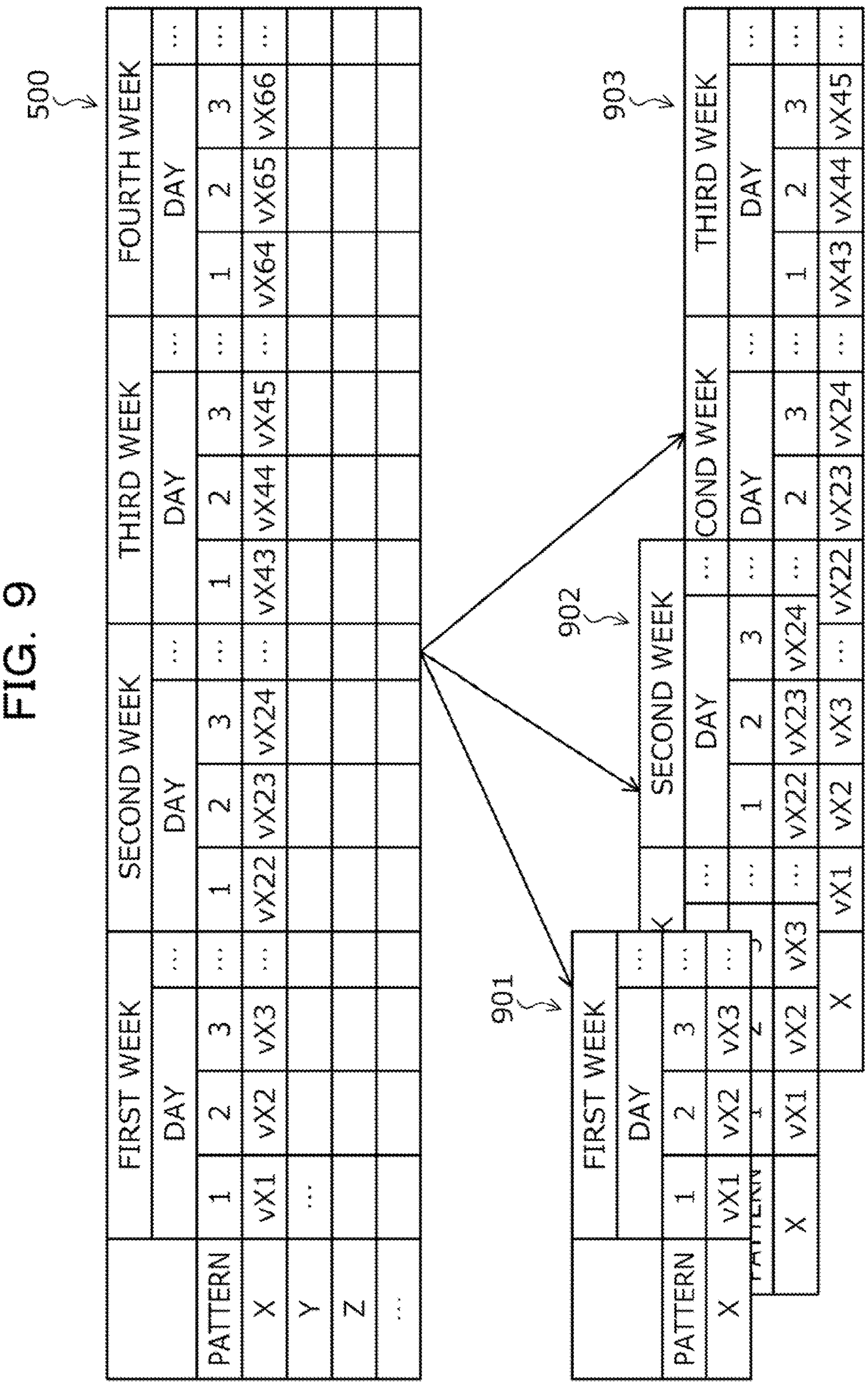
FIG. 9 is an explanatory diagram illustrating a division example of an original problem.

FIG. 9 is an explanatory diagram illustrating a division example of the original problem. Here, the allowable size $d_{max}$ is assumed as "$d_{max}$=8 days". Here, the problem size of the original problem 500 is determined according to the number of days. Therefore, the determination unit 602 determines a reference size $d_{base}$ obtained by dividing the original problem 500 in unit of week or month while evenly dividing the original problem 500 so that the problem size is equal to or less than the allowable size $d_{max}$. The reference size $d_{base}$ corresponds to a division granularity.

Here, an entire period $d_{total}$ is "$d_{total}$=28 days". Therefore, for example, the reference size $d_{base}$ is "$d_{base}$=7" that is units of week equal to or less than the allowable size $d_{max}$. In this case, the problem size (the number of days) of each partial problem $P_i$ is, for example, "$i \cdot d_{base}$" ($i=1, 2, \ldots, d_{total}/d_{base}-1$).

In the example in FIG. 9, the division unit 603 divides the original problem 500 into partial problems 901 to 903, for example, by separating the original problem 500 in unit of week (seven days) from the beginning on the basis of the determined reference size $d_{base}$. The partial problem 901 corresponds to a first week. The partial problem 902 corresponds to first and second weeks. The partial problem 903 corresponds to first to third weeks. Note that, in FIG. 9, a part of each problem is excerpted and displayed.

A problem size of the partial problem 901 is "7 days". A problem size of the partial problem 902 is "14 days". A problem size of the partial problem 903 is "21 days". The solution processing device 201 solves each of the partial problems 901 to 903, for example, in ascending order of the problem size. Note that, although the problem sizes of the partial problems 902 and 903 exceed the allowable size $d_{max}$, some variables are known in the series of solution processing. Therefore, an actual problem size is equal to or less than the allowable size $d_{max}$.

(Creation Example of Constraint Expression of Partial Problem $P_i$)

Next, a creation example of the constraint expression (second constraint expression) of the partial problem $P_i$ will be described with reference to FIGS. 10 to 13. Here, a case will be assumed where the original problem is assumed as the "linear programming problem 500" and the original problem 500 is divided into the partial problems 901 to 903 as illustrated in FIG. 9.

Figure 10:
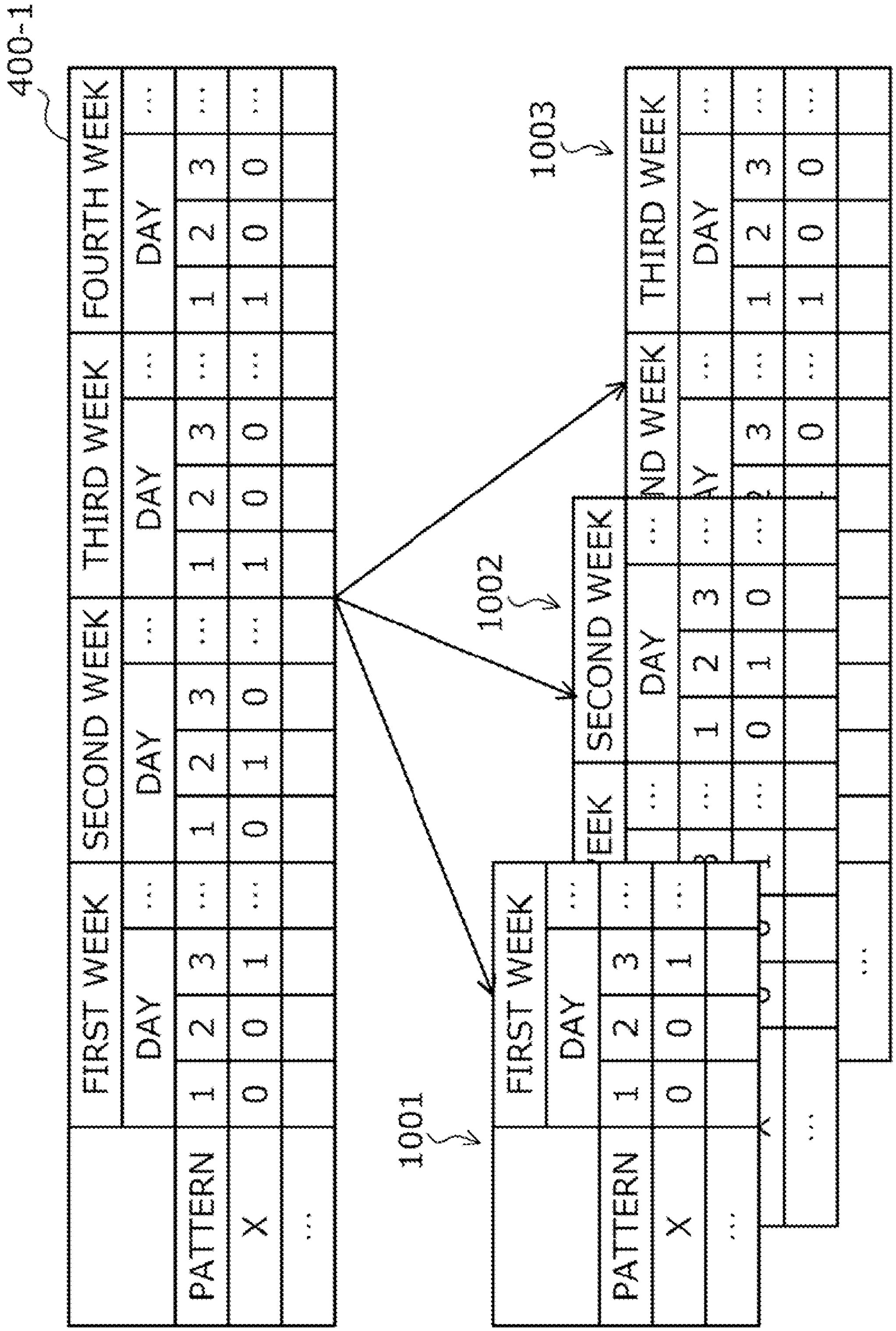
FIG. 10 is an explanatory diagram illustrating an extraction example of allocation result data.

FIG. 10 is an explanatory diagram illustrating an extraction example of allocation result data. In FIG. 10, the past case data 400-1 is illustrated. The past case data 400-1 indicates a past allocation result regarding a variable included in the original problem 500. Note that, in FIG. 10, a part of the past case data 400-1 is excerpted and displayed.

In this case, for example, the second creation unit 607 extracts past allocation result data corresponding to the partial problem 901 (refer to FIG. 9) from the past case data 400-1. Here, the partial problem 901 corresponds to the first week of the original problem 500. Therefore, the second creation unit 607 extracts allocation result data 1001 of the first week from the past case data 400-1 as the past allocation result data corresponding to the partial problem 901. The allocation result data 1001 corresponds to a past shift allocation result of the same person in the same period as the partial problem 901.

Furthermore, for example, the second creation unit 607 extracts past allocation result data corresponding to the partial problem 902 (refer to FIG. 9) from the past case data 400-1. Here, the partial problem 902 corresponds to the first and second weeks of the original problem 500. Therefore, the second creation unit 607 extracts allocation result data 1002 of the first and second weeks from the past case data 400-1 as the past allocation result data corresponding to the partial problem 902. The allocation result data 1002 corresponds to a past shift allocation result of the same person in the same period as the partial problem 902.

Furthermore, for example, the second creation unit 607 extracts past allocation result data corresponding to the partial problem 903 (refer to FIG. 9) from the past case data 400-1. Here, the partial problem 903 corresponds to the first to third weeks of the original problem 500. Therefore, the second creation unit 607 extracts allocation result data 1003 of the first to third weeks from the past case data 400-1 as the past allocation result data corresponding to the partial problem 903. The allocation result data 1003 corresponds to a past shift allocation result of the same person in the same period as the partial problem 903.

Figure 11:
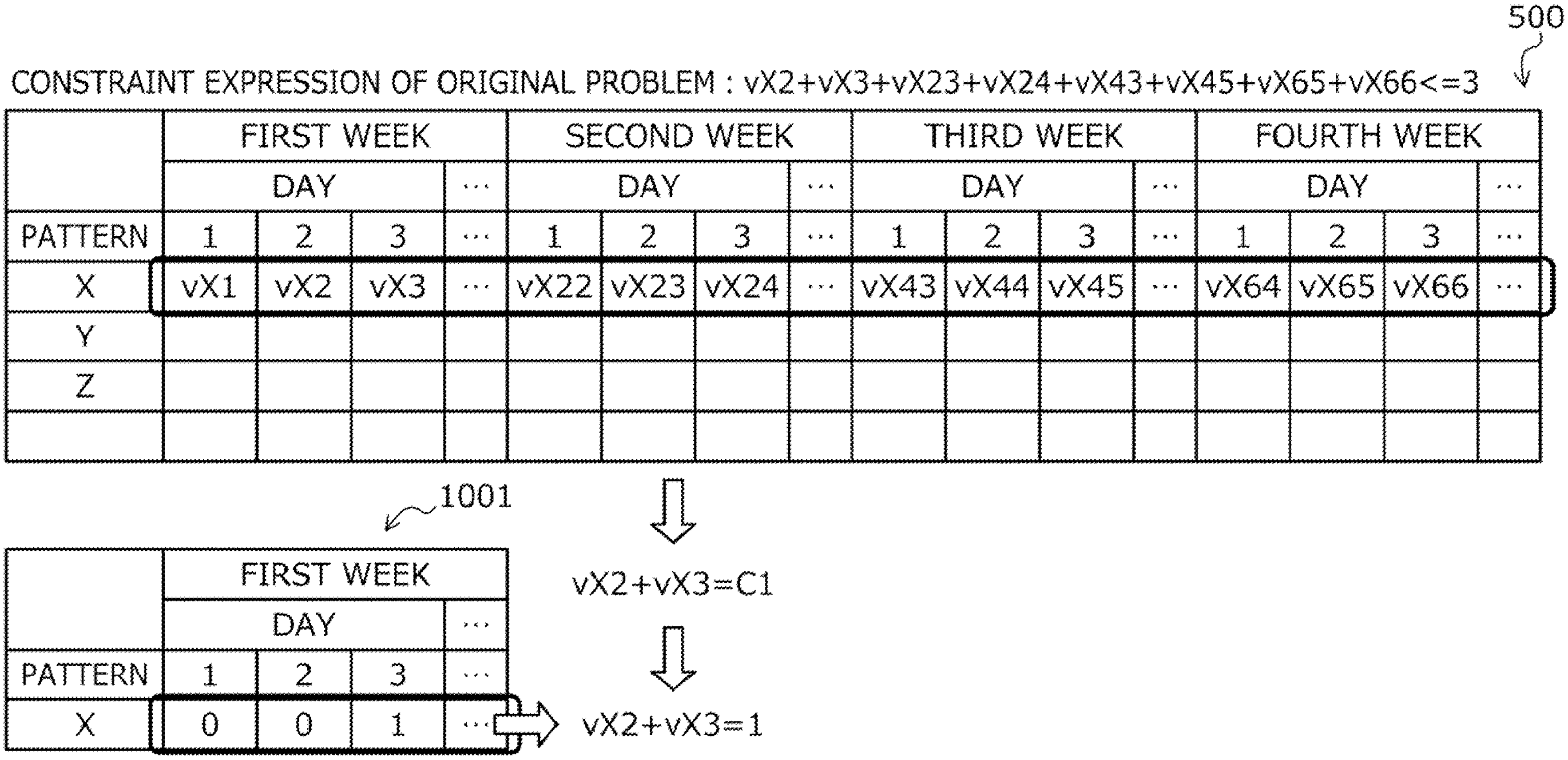
FIG. 11 is an explanatory diagram (part 1) illustrating a creation example of a constraint expression of a partial problem.
Figure 13:
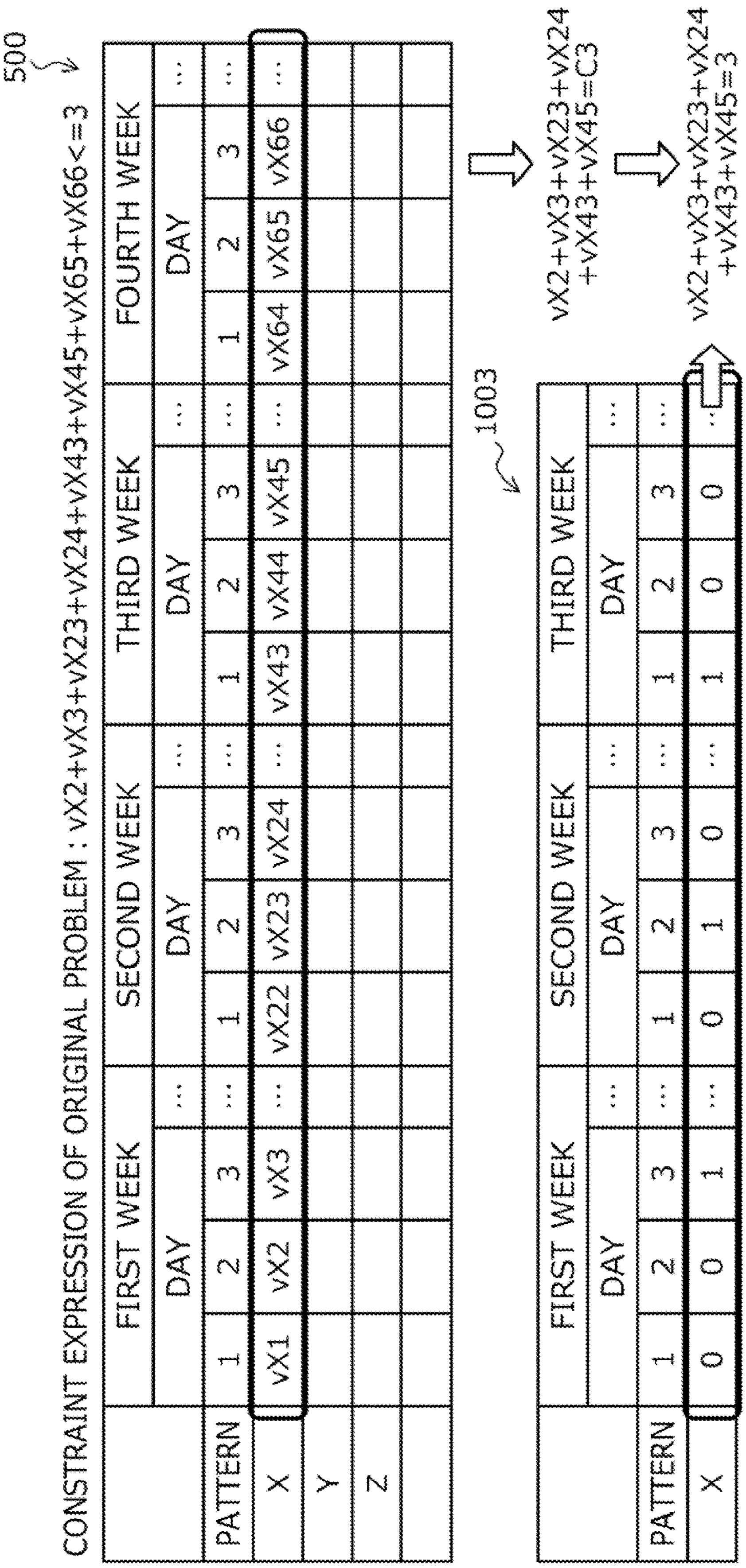
FIG. 13 is an explanatory diagram (part 3) illustrating the creation example of the constraint expression of the partial problem.

FIGS. 11 to 13 are explanatory diagrams illustrating a creation example of the constraint expression of the partial problem. In FIG. 11, a case will be described where a constraint expression (second constraint expression) of the partial problem 901 is created. Here, it is assumed that a constraint expression "vX2+vX3+vX23+vX24+vX43+vX45+vX65+vX66≤3" be one of the constraint expressions of the original problem 500 and be a constraint expression that includes a variable that is not included in the partial problem 901.

In this case, the second creation unit 607 extracts a member including only variables "vX2 and vX3" included in the partial problem 901 from the left side of the constraint expression "vX2+vX3+vX23+vX24+vX43+vX45+vX65+vX66≤3" of the original problem 500 and creates a new constraint expression as the following formula (1). However, C1 is a variable.

$$vX2+vX3=C1 \tag{1}$$

Next, the second creation unit 607 refers to the past allocation result data 1001 corresponding to the partial problem 901 and specifies allocation results (value) for variables same as the variables vX2 and vX3 included in the formula (1) described above. Here, an allocation result "0" for the variable vX2 and an allocation result "1" for the variable vX3 are specified.

Then, the second creation unit 607 calculates a value of C1 by substituting the specified allocation results (value) into the left side of the formula (1) described above. Here, the value of C1 is "1". The second creation unit 607 creates a constraint expression as the following formula (2) by substituting the calculated value of C1 into the formula (1) described above as the constraint expression (second constraint expression) of the partial problem 901.

$$vX2+vX3=1 \tag{2}$$

Note that, here, a case where the constraint expression is expressed as an equation as the formula (1) described above has been described as an example. However, the embodiment is not limited to this. For example, the second creation unit 607 may create a new constraint expression expressed by an inequality as the following formula (3) instead of the formula (1) described above. However, C1 is a variable. The reference a is a constant.

$$C1-a \le vX2+vX3 \le C1+a \tag{3}$$

In FIG. 12, a case will be described where a constraint expression (second constraint expression) of the partial problem 902 is created. Here, it is assumed that a constraint expression "vX2+vX3+vX23+vX24+vX43+vX45+vX65+vX66≤3" be one of the constraint expressions of the original problem 500 and be a constraint expression that includes a variable that is not included in the partial problem 902.

In this case, the second creation unit 607 extracts a member including only variables "vX2, vX3, vX23, and vX24" included in the partial problem 902 from the left side of the constraint expression "vX2+vX3+vX23+vX24+vX43+vX45+vX65+vX66≤3" of the original problem 500 and creates a new constraint expression as the following formula (4). However, C2 is a variable.

$$vX2+vX3+vX23+vX24=C2 \tag{4}$$

Next, the second creation unit 607 refers to the past allocation result data 1002 corresponding to the partial problem 902 and specifies allocation results (value) for variables same as the variables vX2, vX3, vX23, and vX24 included in the formula (4) described above. Here, an allocation result "0" for the variable vX2, an allocation result "1" for the variable vX3, an allocation result "1" for the variable vX23, and an allocation result "0" for the variable vX24 are specified.

Then, the second creation unit 607 calculates a value of C2 by substituting the specified allocation results (value) into the left side of the formula (4) described above. Here, the value of C2 is "2". The second creation unit 607 creates a constraint expression as the following formula (5) by substituting the calculated value of C2 into the formula (4) described above as the constraint expression (second constraint expression) of the partial problem 902.

$$vX2+vX3+vX23+vX24=2 \tag{5}$$

In FIG. 13, a case will be described where a constraint expression (second constraint expression) of the partial problem 903 is created. Here, it is assumed that a constraint expression "vX2+vX3+vX23+vX24+vX43+vX45+vX65+vX66≤3" be one of the constraint expressions of the original problem 500 and be a constraint expression that includes a variable that is not included in the partial problem 903.

In this case, the second creation unit 607 extracts a member including only variables "vX2, vX3, vX23, vX24, vX43, and vX45" included in the partial problem 903 from the left side of the constraint expression "vX2+vX3+vX23+vX24+vX43+vX45+vX65+vX66≤3" of the original problem 500 and creates a new constraint expression as the following formula (6). However, C3 is a variable.

$$vX2+vX3+vX23+vX24+vX43+vX45=C3 \tag{6}$$

Next, the second creation unit 607 refers to the past allocation result data 1003 corresponding to the partial problem 903 and specifies allocation results (value) for variables same as the variables vX2, vX3, vX23, vX24, vX43, and vX45 included in the formula (6) described above. Here, an allocation result "0" for the variable vX2, an allocation result "1" for the variable vX3, an allocation result "1" for the variable vX23, an allocation result "0" for the variable vX24, an allocation result "1" for the variable vX43, and an allocation result "0" for the variable vX45 are specified.

Then, the second creation unit 607 calculates a value of C3 by substituting the specified allocation results (value) into the left side of the formula (6) described above. Here, the value of C3 is "3". The second creation unit 607 creates a constraint expression as the following formula (7) by substituting the calculated value of C3 into the formula (6) described above as the constraint expression (second constraint expression) of the partial problem 903.

$$vX2+vX3+vX23+vX24+vX43+vX45=3 \tag{7}$$

(Specific Example of Solution Processing)

A specific example of the solution processing for obtaining a solution for the original problem 500 will be described with reference FIGS. 14A and 14B.

Figure 14A:
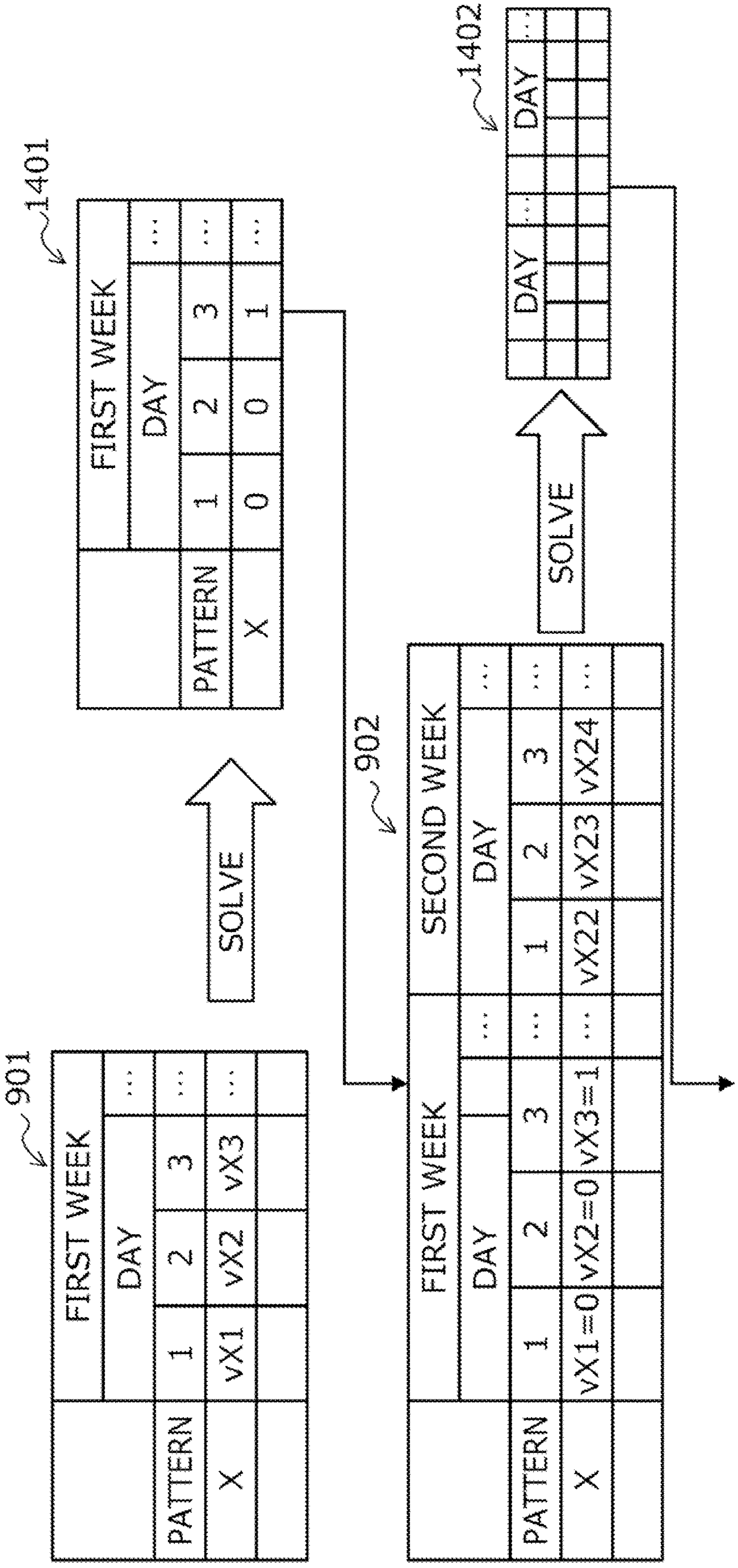
FIG. 14A is an explanatory diagram (part 1) illustrating a specific example of solution processing.
Figure 14B:
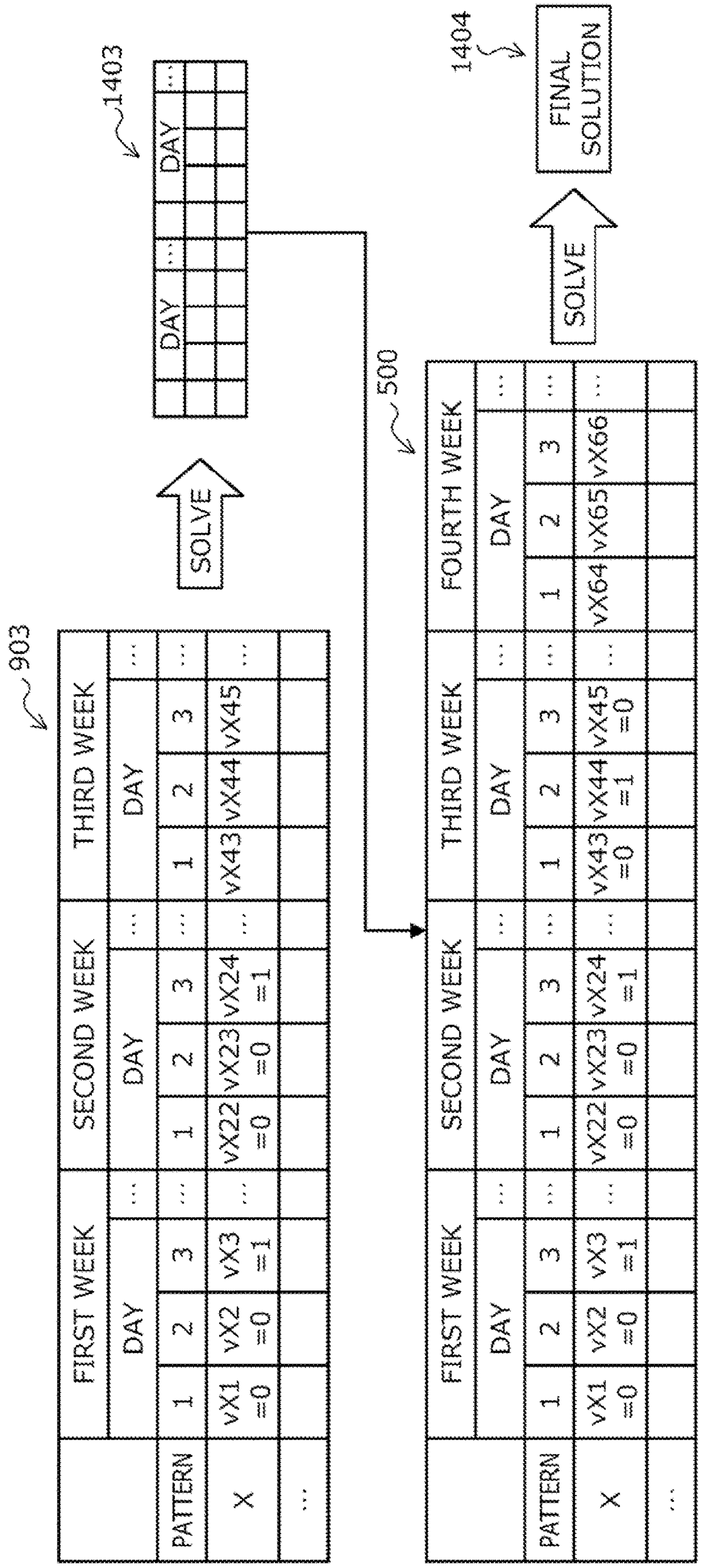
FIG. 14B is an explanatory diagram (part 2) illustrating the specific example of the solution processing.

FIGS. 14A and 14B are explanatory diagrams illustrating a specific example of the solution processing. In FIG. 14A, first, the solution unit 604 solves the partial problem 901 on the basis of the created objective function and constraint expression of the partial problem 901 using an existing solver. It is assumed that a solution result 1401 be obtained as a result. The solution result 1401 indicates a value of each variable included in the partial problem 901.

Next, the solution unit 604 creates a constraint expression "variable=value of solution result" for all the variables included in the partial problem 901 with reference to the solution result 1401 and adds the created constraint expression as a constraint expression of the partial problem 902. For example, it is assumed that the value of the solution result 1401 be "0" for the variable vX1 included in the partial problem 901. In this case, the solution unit 604 creates a constraint expression "vX1=0" for the variable vX1 and adds the created constraint expression as the constraint expression of the partial problem 902.

In this way, by fixing some variables included in the partial problem 902 to a solution that has been already obtained, the problem size of the partial problem 902 is reduced. Then, the solution unit 604 solves the partial problem 902 on the basis of the created objective function and constraint expression (including constraint expression added on the basis of solution result 1401) of the partial problem 902 using an existing solver. It is assumed that a solution result 1402 be obtained as a result. The solution result 1402 indicates a value of each variable included in the partial problem 902.

In FIG. 14B, next, the solution unit 604 creates a constraint expression "variable=value of solution result" for all the variables included in the partial problem 902 with reference to the solution results 1401 and 1402 and adds the created constraint expression as a constraint expression of the partial problem 903. However, as a constraint expression regarding the variable included in the partial problem 901, the created constraint expression may be used.

For example, it is assumed that the value of the solution result 1402 be "0" for the variable vX22 included in the partial problem 902. In this case, the solution unit 604 creates a constraint expression "vX22=0" for the variable vX22 and adds the created constraint expression as the constraint expression of the partial problem 903. In this way, by fixing some variables included in the partial problem 903 to a solution that has been already obtained, the problem size of the partial problem 903 is reduced.

Then, the solution unit 604 solves the partial problem 903 on the basis of the created objective function and constraint expression (including constraint expression added on the basis of solution results 1401 and 1402) of the partial problem 903 using an existing solver. It is assumed that a solution result 1403 be obtained as a result. The solution result 1403 indicates a value of each variable included in the partial problem 903.

Next, the solution unit 604 creates a constraint expression "variable=value of solution result" for all the variables included in the partial problem 903 with reference to the solution results 1401 to 1403 and adds the created constraint expression as a constraint expression of the original problem 500. However, as a constraint expression regarding the variables included in the partial problems 901 and 902, the created constraint expression may be used.

For example, it is assumed that the value of the solution result 1403 be "0" for the variable vX43 included in the partial problem 903. In this case, the solution unit 604 creates a constraint expression "vX43=0" for the variable vX43 and adds the created constraint expression as the constraint expression of the original problem 500. In this way, by fixing some variables included in the original problem 500 to a solution that has been already obtained, the problem size of the original problem 500 is reduced.

Then, the solution unit 604 solves the original problem 500 on the basis of the objective function and the constraint expression (including constraint expression added on the basis of solution results 1401 to 1403) of the original problem 500 using an existing solver. As a result, a final solution 1404 is obtained. The final solution 1404 is a solution for the original problem 500 and indicates the value of each variable included in the original problem 500.

(Allocation Processing Procedure of Solution Processing Device 201)

Next, an allocation processing procedure of the solution processing device 201 will be described with reference to FIG. 15.

Figure 15:
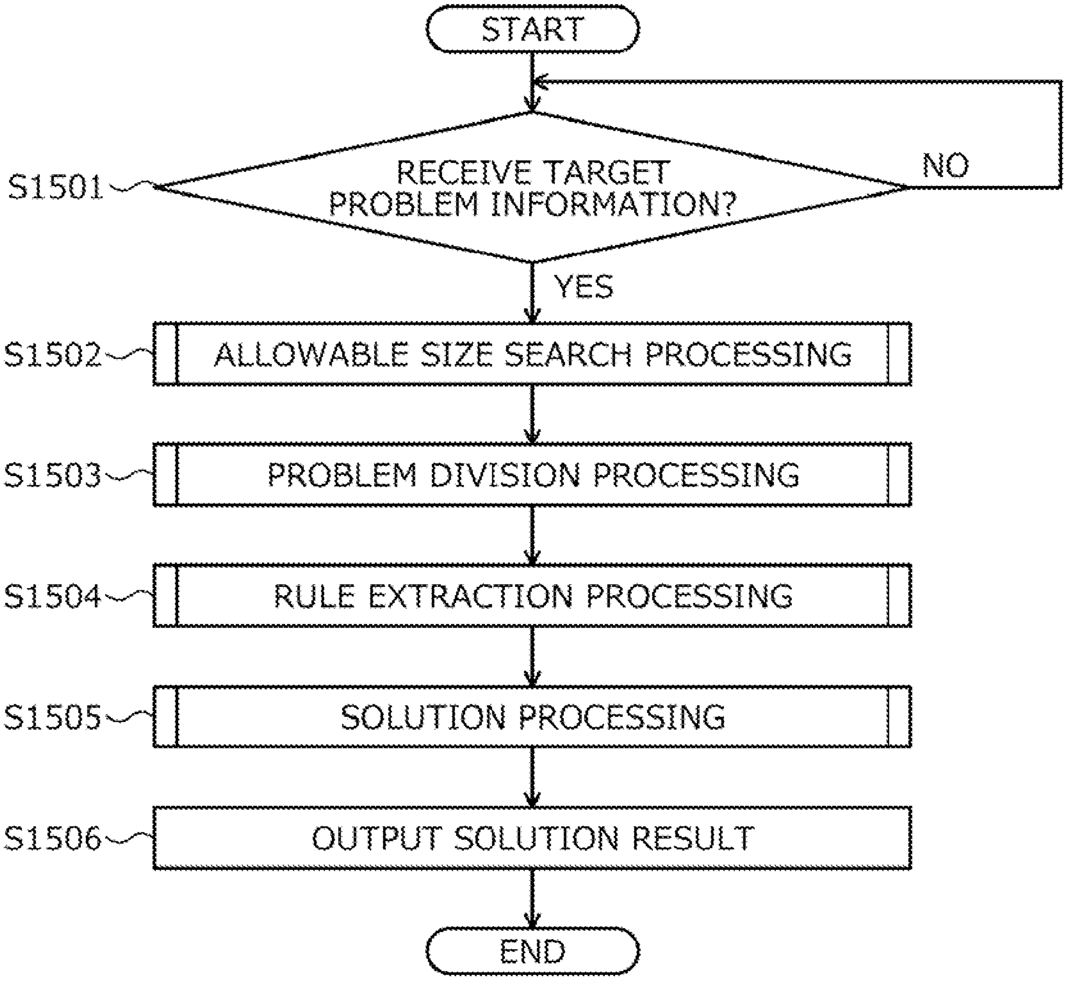
FIG. 15 is a flowchart illustrating an example of an allocation processing procedure of the solution processing device 201.

FIG. 15 is a flowchart illustrating an example of the allocation processing procedure of the solution processing device 201. In FIG. 15, the solution processing device 201 determines whether or not target problem information is received (step S1501). Here, the solution processing device 201 waits for the reception of the target problem information (step S1501: No).

In a case of receiving the target problem information (step S1501: Yes), the solution processing device 201 executes allowable size search processing (step S1502). A specific processing procedure of the allowable size search processing will be described later with reference to FIG. 16.

Next, the solution processing device 201 executes problem division processing of a linear programming problem to be solved (original problem) (step S1503). A specific processing procedure of the problem division processing will be described later with reference to FIG. 17. Then, the solution processing device 201 executes rule extraction processing on a partial problem (step S1504). A specific processing procedure of the rule extraction processing will be described later with reference to FIG. 18.

Next, the solution processing device 201 executes solution processing on the linear programming problem to be solved (step S1505). A specific processing procedure of the solution processing will be described later with reference to FIG. 19. Then, the solution processing device 201 outputs a solution result of the linear programming problem to be solved (step S1506) and ends the series of processing according to this flowchart.

As a result, the solution processing device 201 can obtain a solution that satisfies the constraints throughout the entire problem within a user's allowable time.

Next, the specific processing procedure of the allowable size search processing in step S1502 illustrated in FIG. 15 will be described with reference to FIG. 16.

Figure 16:
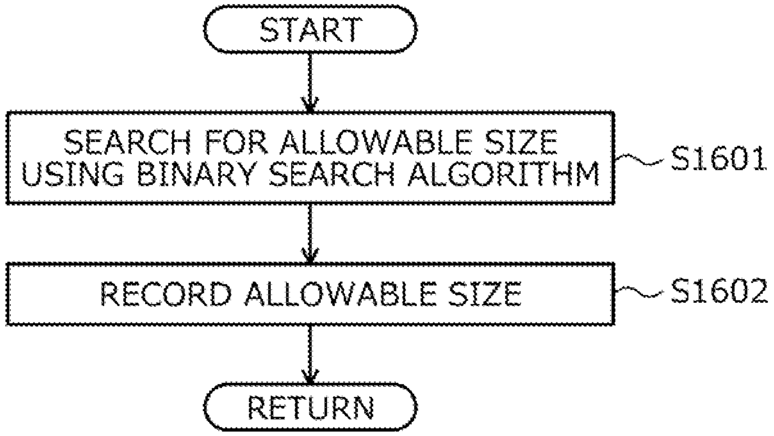
FIG. 16 is a flowchart illustrating an example of a specific processing procedure of allowable size search processing.

FIG. 16 is a flowchart illustrating an example of the specific processing procedure of the allowable size search processing. In the flowchart in FIG. 16, first, the solution processing device 201 searches for an allowable size $d_{max}$ from the problem size of the linear programming problem and the prediction model using the binary search algorithm (step S1601).

Then, the solution processing device 201 records the searched allowable size $d_{max}$ (step S1602) and returns to a step for calling the allowable size search processing. As a result, the solution processing device 201 can obtain the maximum problem size that can be solved within the allowable time $t_{limit}$.

Next, the specific processing procedure of the problem division processing in step S1503 illustrated in FIG. 15 will be described with reference to FIG. 17. Here, a case will be described as an example where the problem size of the original problem (linear programming problem to be processed) is determined according to the number of days and the original problem is divided by a period (the number of days). The allowable size $d_{max}$ corresponds to a period in which a solution can be obtained, for example.

Figure 17:
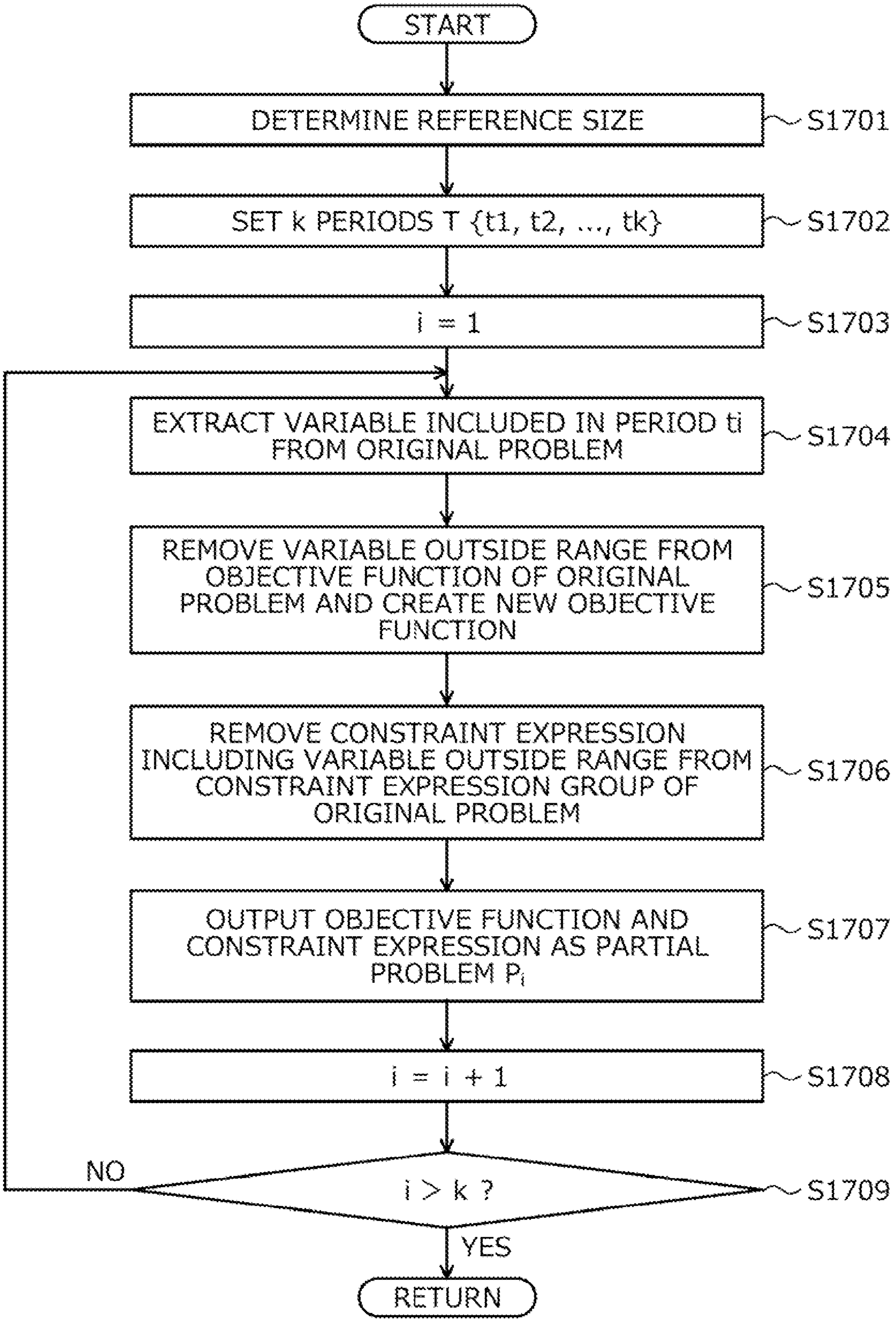
FIG. 17 is a flowchart illustrating an example of a specific processing procedure of problem division processing.

FIG. 17 is a flowchart illustrating an example of the specific processing procedure of the problem division processing. In the flowchart in FIG. 17, first, the solution processing device 201 determines a reference size $d_{base}$ into which the original problem is divided, from the allowable size $d_{max}$ (step S1701). For example, $d_{base}$ is units of week or month equal to or less than the allowable size $d_{max}$.

Then, the solution processing device 201 sets k periods T {t1, t2, . . . , tk} on the basis of the determined reference size $d_{base}$ (step S1702). The reference k is, for example, "$k=d_{total}/d_{base}$". The reference $d_{total}$ indicates an entire period of an original problem. The period ti is a period from the first day to $i \cdot d_{base}=1, 2, \ldots, k$).

Next, the solution processing device 201 sets "i=1" (step S1703) and extracts a variable included in the period ti from the original problem (step S1704). Then, the solution processing device 201 removes a variable outside a range from the objective function of the original problem and creates a new objective function (step S1705). The variable outside the range is a variable different from the variable extracted in step S1704.

Next, the solution processing device 201 removes a constraint expression including the variable outside the range from the constraint expression group of the original problem and creates a new constraint expression (step S1706). Then, the solution processing device 201 outputs the created objective function and constraint expression as the partial problem $P_i$ of the period ti (step S1707).

Next, the solution processing device 201 sets "i=i+1" (step S1708) and determines whether or not i is larger than k (step S1709). Here, in a case where i is equal to or less than k (step S1709: No), the solution processing device 201 returns to step S1704. On the other hand, in a case where i is larger than k (step S1709: Yes), the solution processing device 201 returns to a step for calling the problem division processing.

As a result, the original problem (linear programming problem to be solved) can be divided into the partial problems $P_1$ to $P_k$ for the respective periods t1 to tk on the basis of the reference size $d_{base}$ (division granularity).

Next, the specific processing procedure of the rule extraction processing in step S1504 illustrated in FIG. 15 will be described with reference to FIG. 18.

Figure 18:
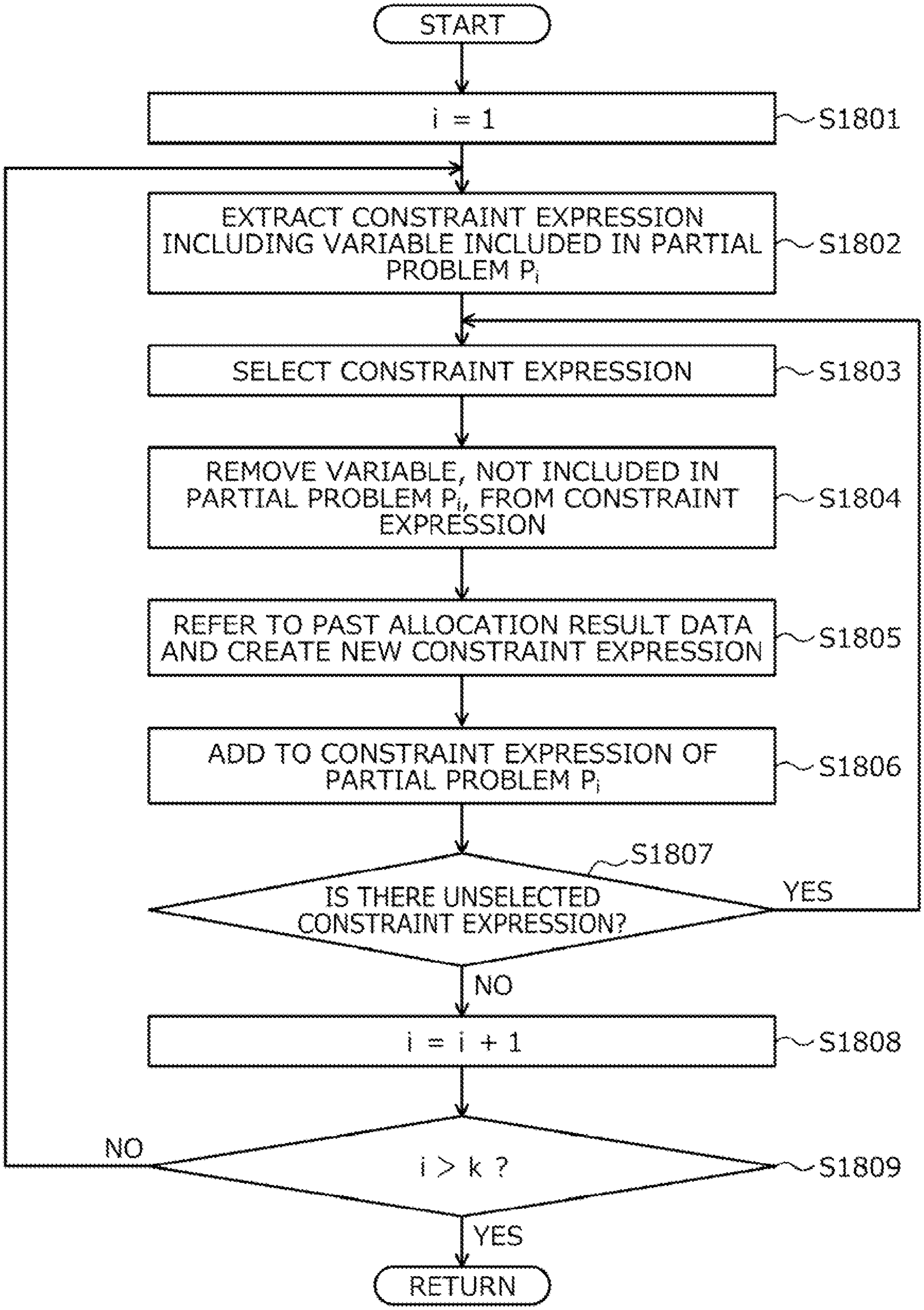
FIG. 18 is a flowchart illustrating an example of a specific processing procedure of rule extraction processing.

FIG. 18 is a flowchart illustrating an example of the specific processing procedure of the rule extraction processing. In the flowchart in FIG. 18, first, the solution processing device 201 sets "i=1" (step S1801) and extracts a constraint expression including the variable included in the partial problem $P_i$ from among the remaining constraint expressions, excluding the constraint expression created in step S1706 illustrated in FIG. 17, of the constraint expression group of the original problem (step S1802).

Next, the solution processing device 201 selects an unselected constraint expression that is not selected, from among the extracted constraint expressions (step S1803). Then, the solution processing device 201 removes a variable, which is not included in the partial problem $P_i$, from the selected constraint expression (step S1804). Next, the solution processing device 201 refers to the past allocation result data and creates a new constraint expression including each of the remaining members (step S1805).

Then, the solution processing device 201 adds the created constraint expression to the constraint expression of the partial problem $P_i$ (step S1806). Next, the solution processing device 201 determines whether or not there is an unselected constraint expression that is not selected from among the extracted constraint expressions (step S1807). Here, in a case where there is an unselected constraint expression (step S1807: Yes), the solution processing device 201 returns to step S1803.

On the other hand, in a case where there is no unselected constraint expression (step S1807: No), the solution processing device 201 sets "i=i+1" (step S1808) and determines whether or not i is larger than k (step S1809). Here, in a case where i is equal to or less than k (step S1809: No), the solution processing device 201 returns to step S1802. On the other hand, in a case where i is larger than k (step S1809: Yes), the solution processing device 201 returns to a step for calling the rule extraction processing.

As a result, it is possible to create the constraint expression (second constraint expression) of each partial problem $P_i$ using the past allocation result data.

Next, the specific processing procedure of the solution processing in step S1505 illustrated in FIG. 15 will be described with reference to FIG. 19.

Figure 19:
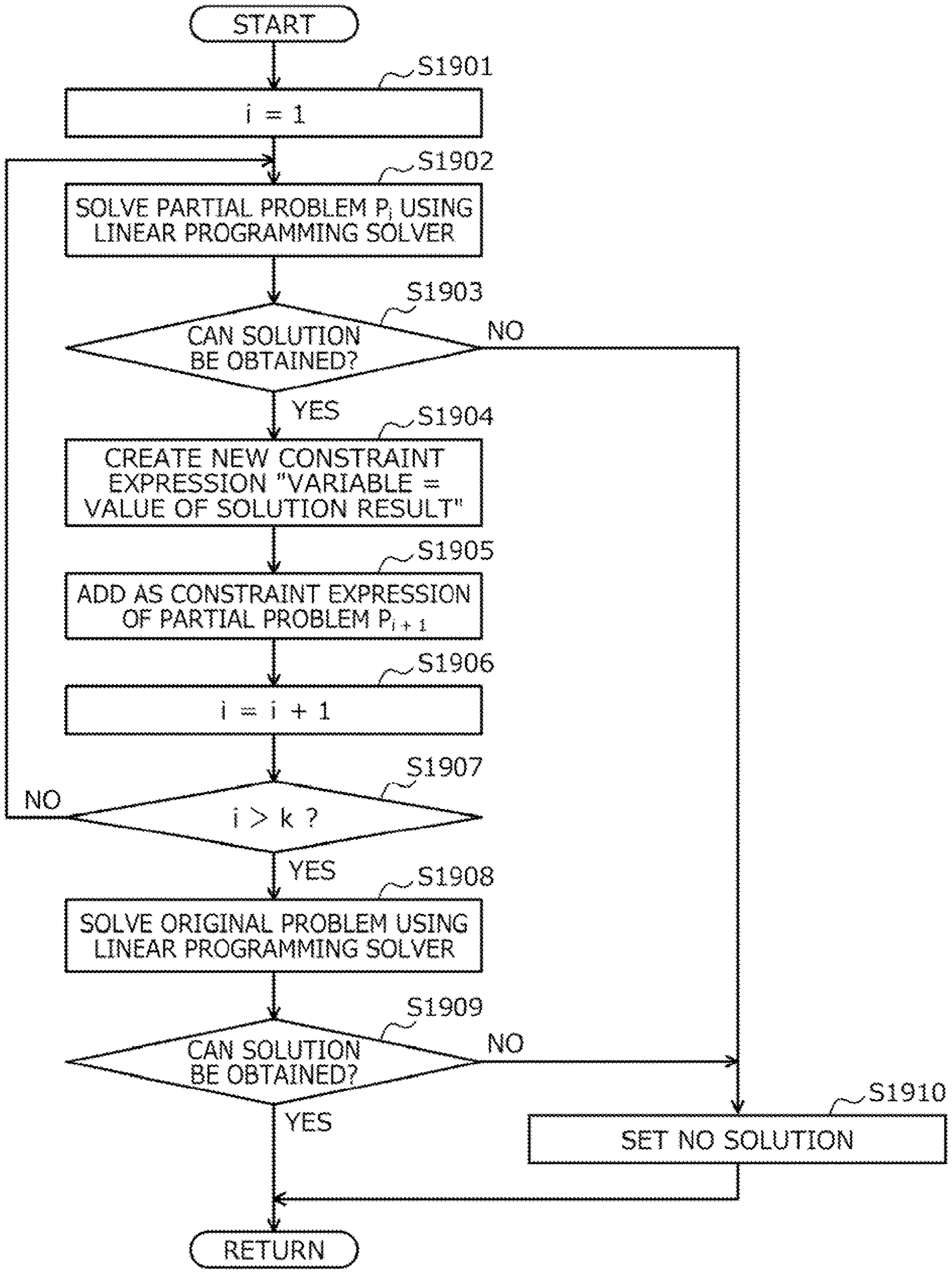
FIG. 19 is a flowchart illustrating an example of a specific processing procedure of the solution processing.

FIG. 19 is a flowchart illustrating an example of the specific processing procedure of the solution processing. In the flowchart in FIG. 19, first, the solution processing device 201 sets "i=1" (step S1901) and solves the partial problem $P_i$ of the partial problems $P_1$ to $P_k$ using the linear programming solver (step S1902).

Then, the solution processing device 201 determines whether or not a solution can be obtained (step S1903). Here, in a case where it is not possible to obtain a solution (step S1903: No), the solution processing device 201 proceeds to step S1910. On the other hand, in a case where it is possible to obtain a solution (step S1903: Yes), a new constraint expression "variable=value of solution result" is created for all the variables on the basis of the solution result of the partial problem $P_i$ (step S1904).

Then, the solution processing device 201 adds the created constraint expression as a constraint expression of the partial problem $P_{i+1}$ (or original problem) (step S1905). Next, the solution processing device 201 sets "i=i+1" (step S1906) and determines whether or not i is larger than k (step S1907).

Here, in a case where i is equal to or less than k (step S1907: No), the solution processing device 201 returns to step S1902. On the other hand, in a case where i is larger than k (step S1907: Yes), the solution processing device 201 solves the original problem using the linear programming solver (step S1908).

Then, the solution processing device 201 determines whether or not a solution can be obtained (step S1909). Here, in a case where a solution can be obtained (step S1909: Yes), the series of processing according to this flowchart ends. On the other hand, in a case where it is not possible to obtain a solution (step S1909: No), the solution processing device 201 sets no solution as the solution result (step S1910) and returns to a step for calling the solution processing.

As a result, the solution processing device 201 can divide the original problem into the partial problems $P_1$ to $P_k$ and solve the problem. Furthermore, by fixing some variables included in each partial problem $P_i$ to a solution that has been already obtained, the solution processing device 201 can suppress the problem size of each partial problem $P_i$ and aim for shortening a time needed to solve the original problem.

As described above, the solution processing device 201 according to the embodiment can determine the division granularity (reference size $d_{base}$) of the original problem on the basis of the allowable time $t_{limit}$ needed to solve the original problem (linear programming problem to be solved). Furthermore, the solution processing device 201 can create the objective function of each partial problem $P_i$ of the partial problems $P_1$ to $P_k$ divided from the original problem on the basis of the determined division granularity, from the objective function of the original problem and can create the constraint expression of each partial problem $P_i$ on the basis of the constraint expression group of the original problem and the past allocation result data regarding the variable included in the original problem. Then, the solution processing device 201 can obtain a solution of the original problem by sequentially solving each partial problem $P_i$ on the basis of the objective function and the constraint expression created for each partial problem $P_i$.

As a result, the solution processing device 201 can shorten the solution time of the original problem by dividing the original problem into the partial problems $P_i$ to $P_k$ and obtaining the solution and can obtain the solution that satisfies the constraints throughout the entire problem within the user's allowable time.

Furthermore, the solution processing device 201 can create the first constraint expression of each partial problem $P_i$ by extracting the constraint expression that consists of only the variables included in each partial problem $P_i$, of the constraint expression group of the original problem. Furthermore, the solution processing device 201 can create the second constraint expression of each partial problem $P_i$ on the basis of the remaining constraint expressions, excluding the first constraint expression, of the constraint expression group of the original problem and the past allocation result data.

As a result, when creating the partial problem $P_i$, the solution processing device 201 uses the constraint expression of the original problem and complements a value using the past allocation result for the constraint expression including the variable that does not appear in the partial problem $P_i$ and can create a new constraint expression.

Furthermore, the solution processing device 201 can search for the allowable size $d_{max}$ on the basis of the problem size of the original problem and the allowable time $t_{limit}$ and can determine the division granularity of the original problem on the basis of the searched allowable size $d_{max}$. For example, the solution processing device 201 searches for the allowable size $d_{max}$ on the basis of the prediction model indicating the correspondence relationship between the problem size and the solution time using the binary search algorithm.

As a result, the solution processing device 201 can determine the division granularity with which the solution can be obtained within the allowable time $t_{limit}$ while performing division into a larger problem size as possible so that a probability that the final solution satisfies the constraint does not decrease.

Furthermore, in a case where the problem size of the original problem is determined according to the number of days, the solution processing device 201 can set units of week or month as the division granularity.

As a result, in a case where the problem size is determined according to the number of days, the constraint is often applied in units of week or month. Therefore, the solution processing device 201 can create a constraint expression of the partial problem $P_i$ that easily leads to a good result by setting unit of week or month as the division granularity.

Furthermore, the solution processing device 201 can output the solution for the original problem.

As a result, the solution processing device 201 can provide a shift allocation result (solution for linear programming problem to be solved) of nurses, operators, or the like.

As a result, the solution processing device 201 can obtain the solution that satisfies the constraints throughout the entire problem within the user's allowable time. As a result, it is possible to automate an allocation work that has been manually performed so far and save energy for a work schedule allocation of shift work employees (for example, nurses, operators, or the like), a usage schedule allocation of operating rooms, or the like.

Note that the solution method described in the present embodiment may be implemented by executing a program prepared in advance on a computer such as a personal computer or a workstation. The present solution program is recorded on a computer-readable recording medium such as a hard disk, flexible disk, CD-ROM, DVD, or USB memory, and is read from the recording medium to be executed by the computer. Furthermore, the solution program may be distributed via a network such as the Internet.

Furthermore, the information processing device 101 (solution processing device 201) described in the present embodiment may be implemented by a special-purpose integrated circuit (IC) such as a standard cell or a structured application specific integrated circuit (ASIC) or a programmable logic device (PLD) such as a field-programmable gate array (FPGA).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:

a memory; and a processor coupled to the memory, the processor being configured to perform processing, the processing including:

receiving, from a user terminal, target problem information including a linear programming problem and an allowable time, the allowable time being a time value set as a time limit for a computational time required to solve the linear programming problem;

determining a division granularity when the linear programming problem is divided into a plurality of partial problems on a basis of the allowable time indicated by the received target problem information, the determining of the division granularity including searching for, based on a prediction model indicating a correspondence relationship between problem size and solution time, a maximum problem size that is solved within the allowable time to determine the division granularity on a basis of the searched maximum problem size, the prediction model having a characteristic such that the solution time exponentially increases with increasing problem size for the linear programming problem;

creating an objective function of each of the partial problems divided from the linear programming problem on a basis of the determined division granularity from an objective function of the linear programming problem;

creating, for each partial problem of the partial problems, a first constraint expression and a second constraint expression, the creating of the first and second constraint expressions including:

extracting, as the first constraint expression, a constraint expression that consists of only variables included in the each partial problem from a constraint expression group of the linear programming problem, extracting terms including only variables included in the each partial problem from remaining constraint expressions, excluding the first constraint expression, of the constraint expression group, referring to past allocation result data regarding variables included in the linear programming problem to specify a value for each term of the extracted terms, and creating, as the second constraint expression, a constraint expression that includes each term of the extracted terms on a basis of the specified value of each term of the terms, thereby reducing a problem size of the each partial problem; and obtaining a solution for the linear programming problem by sequentially solving each of the partial problems on a basis of the objective function and the first and second constraint expressions created for each of the partial problems.

2. The information processing device according to claim 1, wherein the determining of the division granularity includes:

set units of week or month as the division granularity in a case where the problem size of the linear programming problem is determined according to a number of days.

3. The information processing device according to claim 1, the processing further including:

outputting the solution for the linear programming problem.

4. An information processing method implemented by a computer, the information processing method comprising:

receiving, from a user terminal, target problem information including a linear programming problem and an allowable time, the allowable time being a time value set as a time limit for a computational time required to solve the linear programming problem;

determining a division granularity when the linear programming problem is divided into a plurality of partial problems on a basis of the allowable time indicated by the received target problem information, the determining of the division granularity including searching for, based on a prediction model indicating a correspondence relationship between problem size and solution time, a maximum problem size that is solved within the allowable time to determine the division granularity on a basis of the searched maximum problem size, the prediction model having a characteristic such that the solution time exponentially increases with increasing problem size for the linear programming problem;

creating an objective function of each of the partial problems divided from the linear programming problem on a basis of the determined division granularity from an objective function of the linear programming problem;

creating, for each partial problem of the partial problems, a first constraint expression and a second constraint expression, the creating of the first and second constraint expressions including:

extracting, as the first constraint expression, a constraint expression that consists of only variables included in the each partial problem from a constraint expression group of the linear programming problem, extracting terms including only variables included in the each partial problem from remaining constraint expressions, excluding the first constraint expression, of the constraint expression group, referring to past allocation result data regarding variables included in the linear programming problem to specify a value for each term of the extracted terms, and creating, as the second constraint expression, a constraint expression that includes each term of the extracted terms on a basis of the specified value of each term of the terms, thereby reducing a problem size of the each partial problem; and obtaining a solution for the linear programming problem by sequentially solving each of the partial problems on a basis of the objective function and the first and second constraint expressions created for each of the partial problems.

5. A non-transitory computer-readable storage medium storing an information processing program for causing a computer to execute processing, the processing including:

receiving, from a user terminal, target problem information including a linear programming problem and an allowable time, the allowable time being a time value set as a time limit for a computational time required to solve the linear programming problem;

determining a division granularity when the linear programming problem is divided into a plurality of partial problems on a basis of the allowable time indicated by the received target problem information, the determining of the division granularity including searching for, based on a prediction model indicating a correspondence relationship between problem size and solution time, a maximum problem size that is solved within the allowable time to determine the division granularity on a basis of the searched maximum problem size, the prediction model having a characteristic such that the solution time exponentially increases with increasing problem size for the linear programming problem;

creating an objective function of each of the partial problems divided from the linear programming problem on a basis of the determined division granularity from an objective function of the linear programming problem;

creating, for each partial problem of the partial problems, a first constraint expression and a second constraint expression, the creating of the first and second constraint expressions including:

extracting, as the first constraint expression, a constraint expression that consists of only variables included in the each partial problem from a constraint expression group of the linear programming problem, extracting terms including only variables included in the each partial problem from remaining constraint expressions, excluding the first constraint expression, of the constraint expression group, referring to past allocation result data regarding variables included in the linear programming problem to specify a value for each term of the extracted terms, and creating, as the second constraint expression, a constraint expression that includes each term of the extracted terms on a basis of the specified value of each term of the terms, thereby reducing a problem size of the each partial problem; and obtaining a solution for the linear programming problem by sequentially solving each of the partial problems on a basis of the objective function and the first and second constraint expressions created for each of the partial problems.

* * * * *